(12) United States Patent
Safronov et al.

(10) Patent No.: US 11,308,097 B2
(45) Date of Patent: Apr. 19, 2022

(54) METHOD OF AND SERVER FOR GENERATING META-FEATURE FOR RANKING DOCUMENTS

(71) Applicant: YANDEX EUROPE AG, Lucerne (CH)

(72) Inventors: Aleksandr Valerievich Safronov, Moscow (RU); Victor Vitalievich Ploshykhyn, Moscow (RU); Ivan Ivanovich Belotelov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 451 days.

(21) Appl. No.: 16/504,079

(22) Filed: Jul. 5, 2019

(65) Prior Publication Data
US 2020/0192904 A1   Jun. 18, 2020

(30) Foreign Application Priority Data
Dec. 13, 2018   (RU) ................................ 2018144178

(51) Int. Cl.
*G06F 16/00*   (2019.01)
*G06F 16/2457*   (2019.01)
(Continued)

(52) U.S. Cl.
CPC .. *G06F 16/24578* (2019.01); *G06F 16/24539* (2019.01); *G06N 20/00* (2019.01)

(58) Field of Classification Search
CPC ......... G06F 16/24539; G06F 16/24578; G06F 16/3349; G06F 16/953; G06N 20/00
See application file for complete search history.

(56) References Cited

U.S. PATENT DOCUMENTS

| 8,001,141 B1 | 8/2011 | Bar |
| 8,131,716 B2 | 3/2012 | Chevalier et al. |

(Continued)

FOREIGN PATENT DOCUMENTS

| CN | 101523338 A | 9/2009 |
| RU | 2608886 C2 | 1/2017 |

OTHER PUBLICATIONS

Search Report with regard to the counterpart RU Patent Application No. 2018144178 completed Mar. 10, 2020.
(Continued)

*Primary Examiner* — Dinku W Gebresenbet
(74) *Attorney, Agent, or Firm* — BCF LLP

(57) ABSTRACT

A method and a server for generating a meta-feature for ranking documents by a machine learning algorithm (MLA). A past query having been previously submitted on a server is acquired, and a set of past documents having been presented as search results in response to the past query is acquired, where each respective document includes a plurality of features, and respective values for the plurality of features. The meta-feature is generated, where a respective value of the meta-feature for a respective document is based on: a respective value of a given feature of the plurality of features for the respective document, and a value of a parameter associated with the set of past documents. The meta-feature is validated based on its usefulness for ranking future search engine results pages (SERPs). The MLA is then trained to generate the meta-feature for ranking documents in response to a new query.

18 Claims, 8 Drawing Sheets

(51) Int. Cl.
*G06F 16/2453* (2019.01)
*G06N 20/00* (2019.01)

(56) References Cited

U.S. PATENT DOCUMENTS

| | | |
|---|---|---|
| 8,671,093 B2 | 3/2014 | Chapelle et al. |
| 8,850,329 B1 | 9/2014 | Hill et al. |
| 8,924,314 B2 | 12/2014 | Kulkarni et al. |
| 10,528,576 B1* | 1/2020 | Wei ..................... G06F 16/248 |
| 2002/0040311 A1 | 4/2002 | Douglass et al. |
| 2004/0215606 A1 | 10/2004 | Cossock |
| 2006/0122979 A1 | 6/2006 | Kapur et al. |
| 2010/0125570 A1 | 5/2010 | Chapelle et al. |
| 2012/0078825 A1* | 3/2012 | Kulkarni ........... G06F 16/24578 706/12 |
| 2017/0061021 A1* | 3/2017 | Royzner ................ G06N 20/00 |
| 2018/0293242 A1 | 10/2018 | Shishkin et al. |

OTHER PUBLICATIONS

English Abstract for CNCN101523338 retrieved on Espacenet on Mar. 25, 2020.

Zheng et al., "Regression Framework for Learning Ranking Functions Using Relative Relevance Judgments", Conference Paper, Proceedings of the 30th Annual International Acm Sigir Conference on Research and Development in Information Retrieval, Amsterdam, The Netherlands, Jan. 2007, 8 pages.

* cited by examiner

METHOD OF AND SERVER FOR GENERATING META-FEATURE FOR RANKING DOCUMENTS

CROSS-REFERENCE

The present application claims priority to Russian Patent Application No. 2018144178, filed on Dec. 13, 2018, entitled "Method of and Server for Generating Meta-Feature for Ranking Documents," the entirety of which is incorporated herein by reference.

FIELD

The present technology relates to information retrieval in general, and more specifically, to a method of and a server for generating one or more meta-features for ranking documents in response to a given query.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

U.S. Pat. No. 8,671,093 B2 granted on Mar. 13, 2011 to Yahoo! Inc and titled "Click model for search rankings" teaches approaches and techniques for ranking the documents indicated in search results for a query based on click-through information collected for the query in previous query sessions. According to an embodiment of the invention, when calculating a relevance score for a particular document, one may overcome positional bias by utilizing click-through information about other documents previously returned in the same search results as the particular document. According to an embodiment, one may utilize Dynamic Bayesian Network, based on said click-through information, to model relevance. According to an embodiment of the invention, one may utilize click-through information to generate targets for learning a ranking function.

U.S. Pat. No. 8,001,141 B1 granted on Jul. 16, 2011 to A9 Com Inc. and titled "Relevance scores for result ranking and arrangement" teaches methods and systems for configuring the display of items in a network-based merchandising environment. In one embodiment, the invention identifies items within a catalog of items, computes a browse relevance score for each item, and configures the display of a Web page such that items with the highest browse relevance score are prominently displayed. In at least one embodiment, browse data, such as category fit data, popularity data, newness data, etc., are used to compute the browse relevance score for each item.

U.S. Pat. No. 8,924,314 B2 granted on Dec. 30, 2014 to eBay Inc and titled "Search result ranking using machine learning" teaches systems and methods for search result ranking using machine learning. A goal model can be created using machine learning. Responsive to a search query, a plurality of data factors can be inputted into the goal model to create a model output. Search results can be presented to a user based on the model output.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developer(s) of the present technology have appreciated that in some situations, top ranked search results appearing in a search engine results page (SERP) in response to a query may not satisfy a user, who may not necessarily browse on other pages of the SERP and click on lower ranked search results to find the information he or she is looking for, while such lower ranked search results may sometimes provide the user with a satisfactory answer (or a more satisfactory answer compared to the higher ranked results).

Developer(s) of the present technology have also appreciated that search engine operators, such as Google™, Yandex™, Bing™ and Yahoo™, among others, have access to logs that include a large amount of user interaction data with respect to past search results appearing in response to past user queries (the information that is typically stored in search logs and is accessible to the search engine MLAs).

Embodiments of the present technology have been developed based on developers' appreciation that search results provided in response to a given query by a ranking MLA could be ranked by taking into account additional ranking factors, which may be composite or aggregated features generated based on other features, and which may additionally take into account other parameters used by the search engine server, such as a position in a SERP, and relevance scores.

Further, such meta-features could be generated automatically, and periodically validated by using evaluation metrics which may take into account user interactions as a proxy for determining usefulness to the users of the search engine server.

Thus, the present technology is directed to a method and a server for generating meta-features for ranking documents.

Such an approach may provide the user with more satisfactory answers, which minimizes a need for a user to browse several SERPs or resubmitting queries for finding the information he or she is looking for, which in turn may save computational resources on both the client device associated with the user, and the search engine server.

In accordance with a first broad aspect of the present technology, there is provided a computer-implemented method for generating a meta-feature for ranking documents by a machine learning algorithm (MLA) executed by a server, where the method is executable by the server. The method comprises acquiring, by the server, an indication of a past query having been submitted on the server, and acquiring, by the server, a set of past documents, the set of past documents having been presented as search results in response to the past query, where each respective document of the set of past documents includes: a first plurality of features, and respective values for the first plurality of features. The meta-feature is generated by the server, where a respective value of the meta-feature for a respective document is based on: a respective value of a given feature of the first plurality of features for the respective document, and a value of a parameter associated with the set of past documents. The meta-feature is then validated based on its usefulness for ranking future search engine results pages (SERPs), and in response to the usefulness being above a predetermined threshold, the meta-feature is adopted for ranking future SERPs.

In some embodiments of the method, the set of past documents is associated with past user interactions, and the method further comprises, prior to the validating: determining, by the server, the threshold based on the past user interactions with the set of past documents. The validating comprises: receiving, from a plurality of electronic device connected to the server, a current query, the current query being similar to the past query, and generating, by the server, a respective set of current documents relevant to the current query, each current document of the respective set of current documents including the first plurality of features and the meta-feature, the respective set of current documents being at least a subset of the set of past documents. The MLA ranks the respective set of current documents based at least in part on the first plurality of features and the meta-feature to obtain a respective final ranked list of documents. A respective SERP including the respective final ranked list of documents is transmitted to the plurality of electronic devices. At least one respective user interaction with the respective SERP is received from the plurality of electronic devices. The usefulness of the meta-feature is determined based on: the respective user interactions with the respective SERPs.

In some embodiments of the method, the value of the parameter associated with the set of past documents is at least one of: a respective preliminary rank of the respective document, a value of the given feature of at least one other document of the set of past documents, and another value of another feature associated with one of the respective document and at least one other document.

In some embodiments of the method, the method further comprises, prior to the generating the meta-feature: ranking, by a second MLA executed by the server, the set of past documents based on at least a first feature of the first plurality of features to obtain a preliminary ranked list of documents, where each respective document has the respective preliminary rank.

In some embodiments of the method, the generating the meta-feature is further based on: a respective value of another given feature of the first plurality of features for the respective document, and a value of a second parameter associated with the set of past documents.

In some embodiments of the method, the value of the second parameter is at least one of: the respective preliminary rank of the respective document, a value of the other given feature of at least one other document of the set of past documents, and another value of another feature associated with one of the respective document and at least one other document.

In some embodiments of the method, the value of the given feature for the at least one other document in the set of past documents is an average value of the given feature for the set of past documents.

In some embodiments of the method, further comprising: repeating the method for a set of past queries, a respective set of past documents having been provided as respective search results in response to a respective past query of the set of past queries, the respective set of past documents being associated with respective past user interactions.

In some embodiments of the method, the determining the threshold comprises: applying, by the server, a user engagement metric on the respective sets of past documents based on the respective past user interactions to obtain the threshold, and the determining the usefulness of the meta-feature comprises: applying, by the server, a current user engagement metric on the respective SERPs based on the respective user interactions with the respective SERPs to obtain the usefulness.

In some embodiments of the method, the meta-feature is a first meta-feature of a set of meta-features, the generating the first meta-feature further comprises generating each respective meta-feature of the set of meta-features, each respective value of the respective meta-feature being generated based on: a respective value of a respective feature of the first plurality of features, and a respective parameter associated with the respective set of past documents, and the determining to use the first-meta feature is executed further in response to the current user engagement metric of the first meta-feature being above respective current user engagement metrics of remaining meta-features of the set of meta-features.

In some embodiments of the method, the given feature is one of: a query-dependent feature, and a query-independent feature.

In some embodiments of the method, the respective value of the query-independent feature for the respective document is one of: past values for the query-independent feature, and predicted values for the query independent feature.

In accordance with another broad aspect of the present technology, there is provided a computer-implemented method for generating a meta-feature for ranking documents by a machine learning algorithm (MLA) executed by a server, the MLA having been trained to generate the meta-feature for ranking the documents in response to a given query, the method executable by the server. The method comprises receiving, from an electronic device connected to the server, a new query, the MLA not having been trained to rank documents based at least in part on the meta-feature for the new query. A set of current documents relevant to the new query is generated, where each current document of the respective set of current documents includes a first plurality of features. The MLA generates the meta-feature, where a respective value of the meta-feature for a respective current document is based on: a respective predicted value of a given feature of the first plurality of features for the respective document, and a predicted value of a parameter associated with the set of current documents. The MLA ranks the respective set of current documents based at least in part on the first plurality of features and the meta-feature to obtain a respective final ranked list of documents, a respective SERP including the respective final ranked list of documents is transmitted to the electronic device.

In some embodiments of the method, the method further comprises, during a training phase: acquiring, by the server, a set of past queries, each query of the set of past queries having been previously submitted on the server, acquiring, for each query of the set of past queries, a respective set of past documents, the respective set of past documents having been presented as respective search results in response to the respective query, each respective document of the respective set of past documents having: a first plurality of features, and respective values for the first plurality of features. The meta-feature is generated for each respective set of past documents, where a respective value of the meta-feature for the respective document of the respective set of past documents is based on: a respective value of a given feature of the first plurality of features for the respective document, and a value of the given feature for at least one other document in the set of past documents. The meta-feature is validated based on its usefulness for ranking future search engine results pages (SERPs) in response to current queries, each of the current query being one of the set of past queries. In response to the usefulness being above a predetermined threshold: the MLA is trained by the server to generate the meta-feature.

In some embodiments of the method, the validating comprises: receiving, from a plurality of electronic device connected to the server, the current queries, generating, by the server, a respective set of current documents relevant to each the current queries, each current document of the respective set of current documents including the first plurality of features and the meta-feature, ranking, by the MLA, the respective sets of current documents based at least in part on the first plurality of features and the meta-feature to obtain respective final ranked list of documents, transmitting, by the server to the plurality of electronic devices, respective SERPs, each respective SERPs including the respective final ranked list of documents, receiving, by the server from the plurality of electronic devices, at least one respective user interaction with the respective SERP, and determining, by the server, the usefulness of the meta-feature based on: the respective user interactions with the respective SERPs In some embodiments of the method, the respective set of past documents is associated with respective past user interactions, the method comprises, prior to the validating the meta-feature: applying, by the server, a user engagement metric on the respective sets of past documents based on the respective past-user interactions to obtain the threshold, and the determining the usefulness of the meta-feature comprises: applying, by the server, a current user engagement metric on the respective SERPs based on the respective user interactions with the respective SERPs to obtain the usefulness.

In some embodiments of the method, the MLA is trained to generate the meta-feature based on: the meta-feature, the respective SERP, the respective SERP including the respective final ranked list of documents having been generated based in part on the meta-feature, and the respective user interactions with the respective SERP.

In accordance with another broad aspect of the present technology, there is provided a computer-implemented method for ranking documents in response to a given query using a meta-feature by a machine learning algorithm (MLA) executed by a server, the method executable by the server, the method comprising: receiving, from an electronic device connected to the server, a given query generating, by the server, a set of current documents relevant to the new query, each current document of the respective set of current documents including a first plurality of features, ranking, by the MLA, the set of current documents based on at least a portion of the first plurality of features to obtain a preliminary ranked list of documents, generating, by the MLA, the meta-feature, the meta-feature being a relative feature based on at least one given feature of the first plurality of features, a respective value of the meta-feature for a respective current document in the preliminary ranked list of documents being based on: a respective value of the at least one given feature of the first plurality of features for the respective document, and a value of a parameter associated with the preliminary ranked list of documents, ranking, by the MLA, the preliminary ranked list of documents based on at least the meta-feature to obtain a respective final ranked list of documents, and transmitting, by the server to the electronic device, a respective SERP including the respective final ranked list of documents in response to the given query.

In some embodiments of the method, the value of the parameter associated with the preliminary ranked list of documents is a respective preliminary rank of the current document.

In accordance with another broad aspect of the present technology, there is provided a server for generating a meta-feature for ranking documents by a machine learning algorithm (MLA) executed by the server, the server comprising: a processor, a non-transitory computer-readable medium comprising instructions. The processor, upon executing the instructions, being configured to: acquire an indication of a past query having been submitted on the server, and acquire a set of past documents, the set of past documents having been presented as search results in response to the past query, each respective document of the set of past documents including: a first plurality of features, and respective values for the first plurality of features. The meta-feature is generated, where a respective value of the meta-feature for a respective document being is on: a respective value of a given feature of the first plurality of features for the respective document, and a value of a parameter associated with the set of past documents. The meta-feature is validated based on its usefulness for ranking future search engine results pages (SERPs). In response to the usefulness being above a predetermined threshold, the meta-feature is adopted for ranking future SERPs.

In some embodiments of the server, the set of past documents is associated with past user interactions, the processor is further configured to, prior to the validating: determine the threshold based on the past user interactions with the set of past documents, and to validate, the processor is configured to: receive from a plurality of electronic device connected to the server, a current query, the current query being similar to the past query, generate a respective set of current documents relevant to the current query, each current document of the respective set of current documents including the first plurality of features and the meta-feature, the respective set of current documents being at least a subset of the set of past documents, rank, via the MLA, the respective set of current documents based at least in part on the first plurality of features and the meta-feature to obtain a respective final ranked list of documents, transmitting, by the server to the plurality of electronic devices, a respective SERP including the respective final ranked list of documents, receiving, by the server from the plurality of electronic devices, at least one respective user interaction with the respective SERP, and determine the usefulness of the meta-feature based on: the respective user interactions with the respective SERPs In some embodiments of the server, wherein the value of the parameter associated with the set of past documents is at least one of: a respective preliminary rank of the respective document, a value of the given feature of at least one other document of the set of past documents, and another value of another feature associated with one of the respective document and at least one other document.

In some embodiments of the server, wherein the processor is further configured to, prior to the generating the meta-feature: rank, using a second MLA executed by the server, the set of past documents based on at least a first feature of the first plurality of features to obtain a preliminary ranked list of documents, each respective document having the respective preliminary rank.

In some embodiments of the server, the meta-feature is further based on: a respective value of another given feature of the first plurality of features for the respective document, and a value of a second parameter associated with the set of past documents.

In some embodiments of the server, wherein the value of the second parameter is at least one of: the respective preliminary rank of the respective document, a value of the other given feature of at least one other document of the set of past documents, and another value of another feature associated with one of the respective document and at least one other document.

In some embodiments of the server, wherein the value of the given feature for the at least one other document in the set of past documents is an average value of the given feature for the set of past documents.

In some embodiments of the server, wherein the processor is further configured to: execute the instructions for a set of past queries, a respective set of past documents having been provided as respective search results in response to a respective past query of the set of past queries, the respective set of past documents being associated with respective past user interactions.

In some embodiments of the server, to determine the threshold, the processor is configured to: apply a user engagement metric on the respective sets of past documents based on the respective past user interactions to obtain the threshold, and to determine the usefulness, the processor is configured to: apply a current user engagement metric on the respective SERPs based on the respective user interactions with the respective SERPs to obtain the usefulness.

In some embodiments of the server, the meta-feature is a first meta-feature of a set of meta-features, to generate the first meta-feature, the processor is further configured to generate each respective meta-feature of the set of meta-features, each respective value of the respective meta-feature being generated based on: a respective value of a respective feature of the first plurality of features, and a respective parameter associated with the respective set of past documents, and the determining to use the first-meta feature is executed further in response to the current user engagement metric of the first meta-feature being above respective current user engagement metrics of remaining meta-features of the set of meta-features.

In some embodiments of the server, wherein the given feature is one of: a query-dependent feature, and a query-independent feature.

In some embodiments of the server, wherein the respective value of the query-independent feature for the respective document is one of: past values for the query-independent feature, and predicted values for the query independent feature.

In accordance with another broad aspect of the present technology, there is provided a server for generating a meta-feature for ranking documents by a machine learning algorithm (MLA) executed by the server, the MLA having been trained to generate the meta-feature for ranking the documents in response to a given query, the server comprising: a processor, a non-transitory computer-readable medium comprising instructions. The processor, upon executing the instructions, is configured to: receive, from an electronic device connected to the server, a new query, the MLA not having been trained to rank documents based at least in part on the meta-feature for the new query and generate a set of current documents relevant to the new query, each current document of the respective set of current documents including a first plurality of features. The MLA generates the meta-feature, a respective value of the meta-feature for a respective current document being based on: a respective predicted value of a given feature of the first plurality of features for the respective document, and a predicted value of a parameter associated with the set of current documents. The MLA ranks the respective set of current documents based at least in part on the first plurality of features and the meta-feature to obtain a respective final ranked list of documents. A respective SERP including the respective final ranked list of documents is transmitted to the electronic device.

In some embodiments of the server, the processor is further configured to, during a training phase: acquire a set of past queries, each query of the set of past queries having been previously submitted on the server, and acquire, for each query of the set of past queries, a respective set of past documents, the respective set of past documents having been presented as respective search results in response to the respective query, each respective document of the respective set of past documents having: a first plurality of features, and respective values for the first plurality of features. The meta-feature is generated for each respective set of past documents, a respective value of the meta-feature for the respective document of the respective set of past documents being based on: a respective value of a given feature of the first plurality of features for the respective document, and a value of the given feature for at least one other document in the set of past documents. The meta-feature is validated based on its usefulness for ranking future search engine results pages (SERPs) in response to current queries, each of the current query being one of the set of past queries. In response to the usefulness being above a predetermined threshold: the MLA is trained to generate the meta-feature.

In some embodiments of the server, to validate, the processor is configured to: receive, from a plurality of electronic device connected to the server, the current queries, generate a respective set of current documents relevant to each the current queries, each current document of the respective set of current documents including the first plurality of features and the meta-feature, rank, by using the MLA, the respective sets of current documents based at least in part on the first plurality of features and the meta-feature to obtain respective final ranked list of documents, transmit, to the plurality of electronic devices, respective SERPs, each respective SERPs including the respective final ranked list of documents, receive, from the plurality of electronic devices, at least one respective user interaction with the respective SERP, and determine the usefulness of the meta-feature based on: the respective user interactions with the respective SERPs In some embodiments of the server, the respective set of past documents is associated with respective past user interactions, the processor is further configured to, prior to the validating the meta-feature: apply a user engagement metric on the respective sets of past documents based on the respective past-user interactions to obtain the threshold. To determine the usefulness of the meta-feature the processor is configured to: apply a current user engagement metric on the respective SERPs based on the respective user interactions with the respective SERPs to obtain the usefulness.

In some embodiments of the server, the MLA is trained to generate the meta-feature based on: the meta-feature, the respective SERP, the respective SERP including the respective final ranked list of documents having been generated based in part on the meta-feature, and the respective user interactions with the respective SERP.

In accordance with another broad aspect of the present technology, there is provided a server for ranking documents in response to a given query using a meta-feature by using a machine learning algorithm (MLA) executed by the server, the server comprising: a processor, a non-transitory computer-readable medium comprising instructions. The processor, upon executing the instructions, is configured to: receive, from an electronic device connected to the server, a given query, and generate a set of current documents relevant to the new query, each current document of the respective set of current documents including a first plurality of features. The MLA ranks the set of current documents based on at least a portion of the first plurality of features to obtain a preliminary ranked list of documents. The MLA generates the meta-feature, the meta-feature being a relative feature based on at least one given feature of the first plurality of features, a respective value of the meta-feature for a respective current document in the preliminary ranked list of documents being based on: a respective value of the at least one given feature of the first plurality of features for the respective document, and a value of a parameter associated with the preliminary ranked list of documents. The MLA ranks the preliminary ranked list of documents based on at least the meta-feature to obtain a respective final ranked list of documents. A respective SERP including the respective final ranked list of documents in response to the given query is transmitted to the electronic device.

In some embodiments of the server, wherein the value of the parameter associated with the preliminary ranked list of documents is a respective preliminary rank of the current document.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
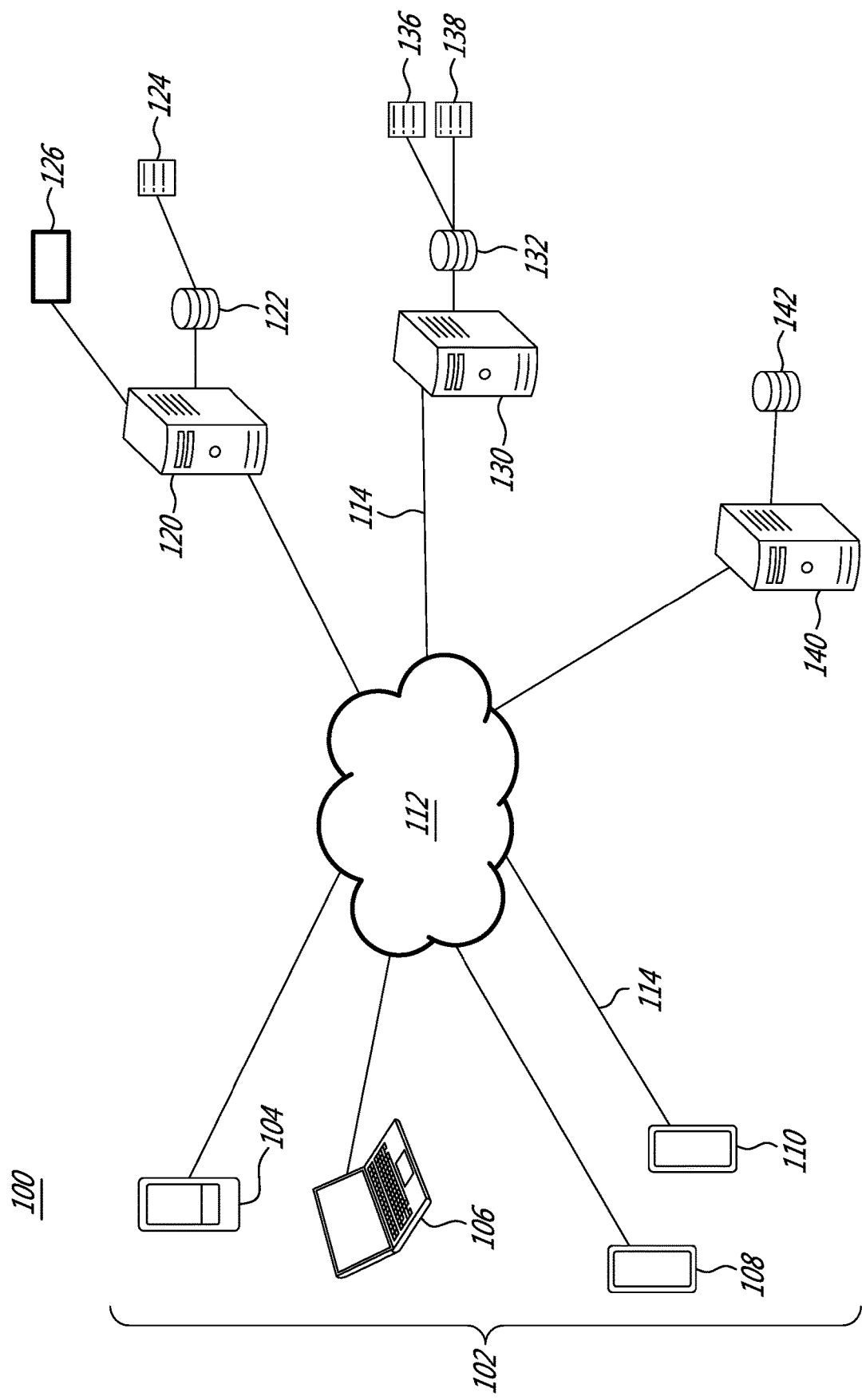
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a plurality of client devices 102, the plurality of client devices 102 including a first client device 104, a second client device 106, a third client device 108, and a fourth client device 110 coupled to a communication network 112 via a respective communication link 114 (only one numbered in FIG. 1). The system 100 comprises a search engine server 120, a tracking server 130 and a training server 140 coupled to the communication network 112 via their respective communication link 114.

As an example only, the first client device 104 may be implemented as a smartphone, the second client device 106 may be implemented as a laptop, the third client device 108 may be implemented as a smartphone and the fourth client device 110 may be implemented as a tablet. In some non-limiting embodiments of the present technology, the communication network 112 can be implemented as the Internet. In other embodiments of the present technology, the communication network 112 can be implemented differently, such as any wide-area communications network, local-area communications network, a private communications network and the like.

How the given communication link 114 is implemented is not particularly limited and will depend on how the associated one of the first client device 104, the second client device 106, the third client device 108 and the fourth client device 110 are implemented. Merely as an example and not as a limitation, in those embodiments of the present technology where at least one of the first client device 104, the second client device 106, the third client device 108 and the fourth client device 110 is implemented as a wireless communication device (such as a smart-phone), the associated one of the communication link 114 can be implemented as a wireless communication link (such as but not limited to, a 3G communications network link, a 4G communications network link, a Wireless Fidelity, or WiFi® for short, Bluetooth® and the like). In those examples, where at least one of the first client device 104, the second client device 106, the third client device 108 and the fourth client device 110 are implemented respectively as laptop, smartphone, tablet computer, the associated communication link 114 can be either wireless (such as the Wireless Fidelity, or WiFi® for short, Bluetooth® or the like) or wired (such as an Ethernet based connection).

It should be expressly understood that implementations for the plurality of client devices 102 including the first client device 104, the second client device 106, the third client device 108, the fourth client device 110, the communication link 114 and the communication network 112 are provided for illustration purposes only. As such, those skilled in the art will easily appreciate other specific implementational details for the first client device 104, the second client device 106, the third client device 108, the fourth client device 110 and the communication link 114 and the communication network 112. As such, by no means, examples provided herein above are meant to limit the scope of the present technology.

While only four client devices 104, 106, 108 and 110 are illustrated (all are shown in FIG. 1), it is contemplated that any number of client devices in the plurality of client devices 102 could be connected to the system 100. It is further contemplated that in some implementations, the number of client devices in the plurality of client devices 102 included in the system 100 could number in the tens or hundreds of thousands.

Search Engine Server

Also coupled to the communication network 112 is the aforementioned search engine server 120. The search engine server 120 can be implemented as a conventional computer server. In an example of an embodiment of the present technology, the search engine server 120 can be implemented as a Dell™ PowerEdge™ Server running the Microsoft™ Windows Server™ operating system. Needless to say, the search engine server 120 can be implemented in any other suitable hardware and/or software and/or firmware or a combination thereof. In the depicted non-limiting embodiment of present technology, search engine server 120 is a single server. In alternative non-limiting embodiments of the present technology, the functionality of the search engine server 120 may be distributed and may be implemented via multiple servers. In some embodiments of the present technology, the search engine server 120 is under control and/or management of a search engine operator. Alternatively, the search engine server 120 can be under control and/or management of a service provider.

The search engine server 120 maintains a search log database 122, the search log database 122 including an index 124.

Generally speaking, the purpose of the search engine server 120 is to: (i) discover and index documents available on the Web; (ii) execute searches in response to a given search query; (iii) execute analysis of documents and perform ranking of documents in response to the given search query; (iv) group the documents and compile the search engine result page (SERP) to be outputted to a client device (such as one of the first client device 104, the second client device 106, the third client device 108 and the fourth client device 110), the client device having been used to submit the given search query that resulted in the SERP.

How the search engine server 120 is configured to discover and index documents, execute searches, analysis and ranking of documents is not particularly limited. Those skilled in the art will appreciate several ways and means to implement the search engine server 120 and as such, several structural components of the search engine server 120 will only be described at a high level.

The search engine server 120 is configured to execute a document discovery procedure (not depicted), which is generally used by the search engine server 120 for discovering documents available over the communication network 112. For example, the search engine server 120 is configured to execute a "crawler" application that "visits" network resources available over the communication network 112 and downloads them for further processing.

The nature of documents that the search engine server 120 is configured to visit and download is not particularly limited but, for sake of illustration only, the documents described herein may be representative of web pages, images, PDFs, Word™ documents, PowerPoint™ documents that are available over the communication network 112.

The search engine server 120 may also be configured to execute an indexing procedure (not depicted), which is generally used by the search engine server 120 for building and/or maintaining indexing structures employed by the given search engine for performing searches. For example, the search engine server 120 is configured to build and/or maintain an inverted index, which will be referred to as the index 124.

How the index 124 is implemented in the present technology is not particularly limiting but, just as an example, the index 124 comprises a number of posting lists each on which is associated with a respective "searchable term". A given posting in a given posting list includes some type of data that is indicative of a given document that includes the searchable term associated with the given posting list and, optionally, includes some additional data (for example, where in the document the searchable term appears, number of appearances in the document, and the like). In summary, every posting list corresponds to a searchable term, and comprises a series of postings referencing each of the discovered documents that contain at least one occurrence of that respective searchable term (or a portion thereof).

It should be mentioned that additional data, such as features of the indexed documents, may also be found in a given posting; for example, the number of occurrences of a given searchable term in a given document; whether this search term occurs in the title of the given document, etc. Naturally, this additional data may be different depending on the given search engine and inter alia various implementations of the present technology.

Searchable terms are typically, but not exclusively, words or other character strings. A given search engine may typically deal with practically every word in a number of different languages, as well as proper names, numbers, symbols, etc. A very commonly used word may have a posting list of as many as one billion postings (or even more).

The search engine server 120 may also be configured to execute a querying procedure (not depicted), which is generally used by the search engine server 120 for identifying documents that may contain some part of a given query submitted to the given search engine. For example, when a given query (such as a current query of a user of the first client device 104, for example) is received by the search engine server 120, the search engine server 120 may parse the given query into a plurality of searchable terms. The search engine server 120 may then access the index 124 and identify posting lists that are associated with at least one of the plurality of searchable terms. As a result, the search engine server 120 may access at least some postings in the so-identified posting lists and identify at least some documents that may contain at least some of the plurality of searchable terms of the given query.

The search engine server 120 is configured to execute ranking of the identified documents in the index 124 that contain at least some of the plurality of searchable terms of the given query.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 120 can thus calculate and assign a relevance score (based on the different criteria listed above) to each search result obtained in response to a user-submitted search query and generate a SERP, where search results are ranked according to their respective relevance scores.

In the embodiment illustrated herein, the search engine server 120 executes one or more machine learning algorithms (MLAs) 126 for ranking documents in response to the given query, which will be referred to as the MLA 126. Briefly speaking, the MLA 126 has been trained by the training server 140 to estimate relevance of a given document to a given query based on inter alia (i) features of the given document and (ii) features of the given query. The MLA 126 may also have been trained to consider past user interactions of users with the given document in response to the given query (as tracked by the tracking server 130, which will be described in more detail herein below), and to predict user interactions with documents based on feature of the given document and the given query.

As a non-limiting example, to rank a set of documents in response to given query, the MLA 126 may be configured to execute a base-line relevance estimation step (not depicted in FIG. 1), and a rank-adjustment score step (not depicted in FIG. 1). It is contemplated that in alternative embodiments of the present technology, ranking of documents be executed in more steps, or in a single step.

The base-line relevance estimation step is generally used to estimate a relevance of a given document to a given query by the MLA 126 based on features of the given query and/or features of the given document. The search engine server 120 generates a preliminary SERP where each given document is associated with a respective preliminary rank based on the respective preliminary ranking score of the given document to the given query estimated by the MLA 126

The search engine server 120 executes the rank-adjustment score determination step, which is generally used for generating rank-adjustment scores for documents for re-ranking at least some documents on the preliminary SERP, where documents are associated with respective preliminary ranks. The rank-adjustment score step may also be executed by the the MLA 126, or may be executed by another MLA (not depicted). In other embodiments of the present technology, the rank-adjustment score may not be executed by a MLA.

The execution of the rank-adjustment score determination step may result in the search engine server 120 re-ranking documents with respect to one another at least partially based on the respective rank-adjustment scores. This means that at least one document on the SERP, following such a re-ranking of the documents, may be associated with a new rank that is different from its respective preliminary rank.

In some embodiments of the present technology, the search engine server 120 can execute ranking for several types of searches, including but not limited to, a general search and a vertical search.

Tracking Server

Also coupled to the communication network 112 is the above-mentioned tracking server 130. The tracking server 130 can be implemented as a conventional computer server. In an example of an embodiment of the present technology, the tracking server 130 can be implemented as a Dell™ PowerEdge™ Server running the Microsoft™ Windows Server™ operating system. Needless to say, the tracking server 130 can be implemented in any other suitable hardware and/or software and/or firmware or a combination thereof. In the depicted non-limiting embodiment of present technology, the tracking server 130 is a single server. In alternative non-limiting embodiments of the present technology, the functionality of the tracking server 130 may be distributed and may be implemented via multiple servers. In other embodiments, the functionality of the tracking server 130 may be performed completely or in part by the search engine server 120. In some embodiments of the present technology, the tracking server 130 is under control and/or management of a search engine operator. Alternatively, the tracking server 130 can be under control and/or management of another service provider.

Generally speaking, the tracking server 130 is configured to track user interactions with search results provided by the search engine server 120 in response to user requests (e.g. made by users of one of the first client device 104, the second client device 106, the third client device 108 and the fourth client device 110). The tracking server 130 may track user interactions (such as, for example, click-through data) when users perform general web searches and vertical web searches on the search engine server 120, and store the user interactions in a tracking database 132.

The tracking server 130 may also be configured to automatically determine user interactions parameters based on tracked user interactions with search results. As a non-limiting example, the tracking server 130 may compute a click-through rate (CTR), at predetermined intervals of time or upon receiving an indication, based on a number of clicks on an element and number of times the element was shown (impressions) in a SERP.

Non-limiting examples of user interactions tracked by the tracking server 130 include:

Loss/Win: was the document clicked in response to the search query or not.

Views: how many times the document was shown.

Dwell time: time a user spends on a document before returning to the SERP.

Long/short click: was the user interaction with the document long or short, compared to the user interaction with other documents on the SERP.

Naturally, the above list is non-exhaustive and may include other types of user interactions without departing from the scope of the present technology. In some embodiments, the tracking server 130 may compile user interaction data (which may, as a non-limiting example, include user interactions for every hour) and generate user interactions to be stored in the tracking database 132 in a suitable format for implementing the present technology (which, may as a non-limiting example, be user interactions for a predetermined period of time of 3 months). In other embodiments, the tracking server 130 may store the user interaction data in a raw form in the tracking database 132, such that it can be retrieved and compiled by at least one of the search engine server 120, the training server 140, or another server (not depicted) in a suitable format for implementing the present technology.

The tracking server 130 typically maintains the above-mentioned tracking database 132, the tracking database 132 including a query log 136 and a user interaction log 138.

The purpose of the query log 136 is to log searches that were made using the search engine server 120. More specifically, the query log 136 maintains terms of search queries (i.e. the associated search words) and the associated search results. It is noted that the query log 136 can be maintained in an anonymized manner—i.e. search queries are not trackable to the users who have submitted the search query.

More specifically, the query log 136 may include a list of queries with their respective terms, with information about documents that were listed by the search engine server 120 in response to a respective query, a timestamp, and may also contain a list of users identified by anonymous IDs (or without an ID altogether) and the respective documents they have clicked on after submitting a query. In some embodiments, the query log 136 may be updated every time a new search is performed on the search engine server 120. In other embodiments, the query log 136 may be updated at predetermined intervals of time. In some embodiments, there may be a plurality of copies of the query log 136, each corresponding to the query log 136 at different points in time.

The user interaction log 138 may be linked to the query log 136, and list user interactions as tracked by the tracking server 130 after a user has submitted a query and clicked on one or more documents on a SERP on the search engine server 120. As a non-limiting example, the user interaction log 138 may contain a reference to a document, which may be identified by an ID number or an URL, a list of queries, where each query of the list of queries has been used to access the document, and respective user interactions associated with the document for the respective query of the list of queries (if the document was interacted with), which will be described in more detail herein below. The plurality of user interactions may generally be tracked and compiled by the tracking server 130, and in some embodiments may be listed for each individual user.

In some embodiments, the tracking server 130 may send tracked queries, search result and user interactions to the search engine server 120, which may store the tracked queries, user interactions and associated search results in the search log database 122. In alternative non-limiting embodiments of the present technology, the functionality of the tracking server 130 and the search engine server 120 can be implemented by a single server.

Training Server

Also coupled to the communications network is the above-mentioned training server 140. The training server 140 can be implemented as a conventional computer server. In an example of an embodiment of the present technology, the training server 140 can be implemented as a Dell™ PowerEdge™ Server running the Microsoft™ Windows Server™ operating system. Needless to say, the training server 140 can be implemented in any other suitable hardware and/or software and/or firmware or a combination thereof. In the depicted non-limiting embodiment of present technology, the training server 140 is a single server. In alternative non-limiting embodiments of the present technology, the functionality of the training server 140 may be distributed and may be implemented via multiple servers. In the context of the present technology, the training server 140 may implement in part the methods and system described herein. In some embodiments of the present technology, the training server 140 is under control and/or management of a search engine operator. Alternatively, the training server 140 can be under control and/or management of another service provider.

Generally speaking, the training server 140 is configured to train the MLA 126 used by the search engine server 120, the tracking server 130 and/or other servers (not depicted) associated with the search engine operator. The training server 140 may, as an example, train one or more MLAs associated with the search engine provider for optimizing general web searches, vertical web searches, providing recommendations, predicting outcomes, and other applications. The training and optimization of the MLAs may be executed at predetermined periods of time, or when deemed necessary by the search engine provider.

In the context of the present technology, the training server 140 is configured to: (i) generate one or more meta-features for sets of past documents having been presented in response to past queries; (ii) validate the one or more meta-features; (iii) generate a set of training objects including the one or more meta-features; and (3) train the MLA 126 for generating the one or more meta-features for a given set of documents in response to a new query, where the new query is not one of the past queries. However, the non-limiting embodiments of the present technology can also be applied to the new query that is either similar or the same as one of the past queries.

The training server 140 may maintain a training database 142 for storing training objects and/or meta-features for the different MLAs used by the search engine server 120, the tracking server 130 and/or other servers (not depicted) associated with the search engine operator.

Figure 2:
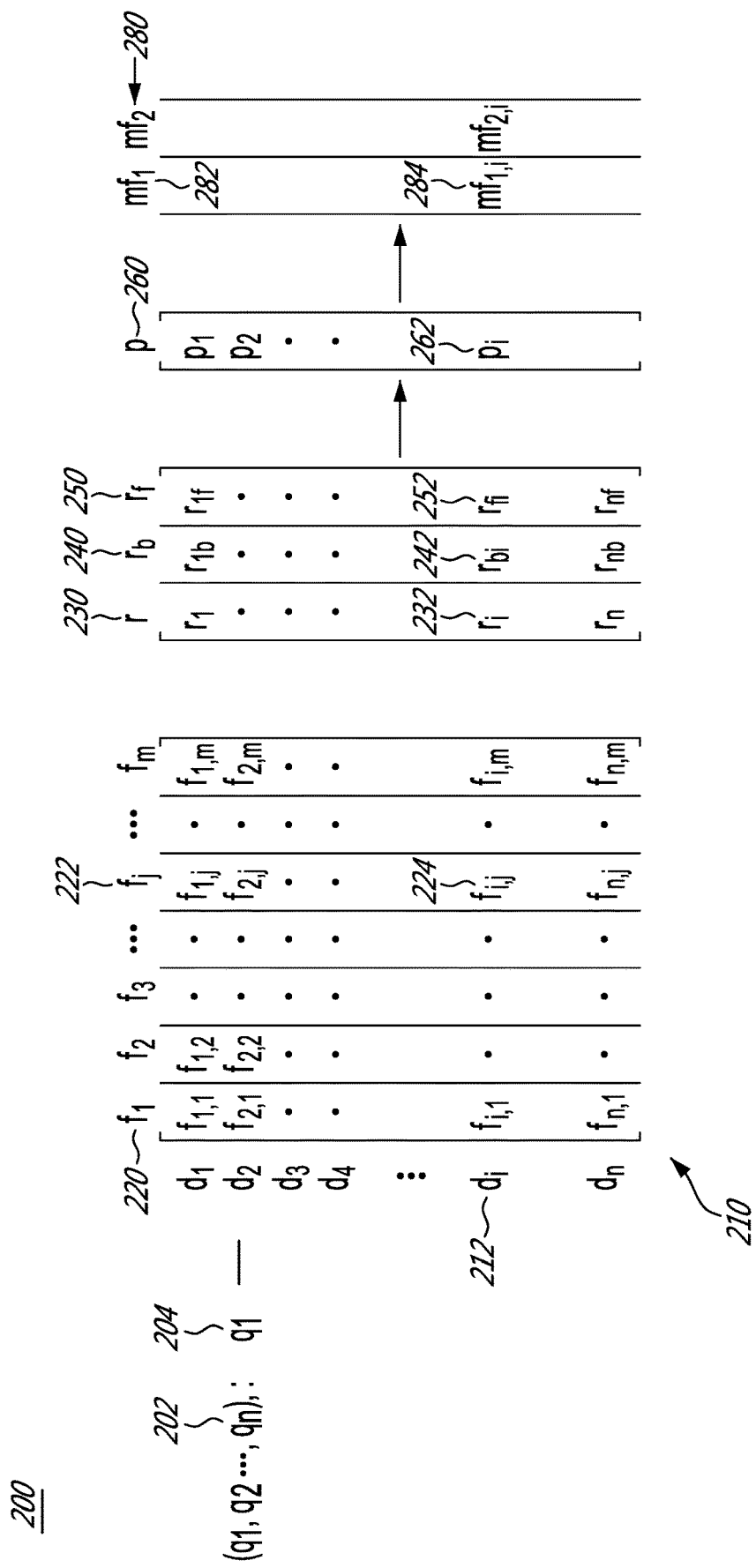
FIG. 2 depicts a schematic diagram of a meta-feature generation procedure executable within the system of FIG. 1 in accordance with non-limiting embodiments of the present technology.

Now turning to FIG. 2, there is depicted a meta-feature generation procedure 200 executed by the training server 140 in accordance with non-limiting embodiments of the present technology.

Generally speaking, the training server 140 is configured to execute the meta-feature generation procedure 200 to generate a plurality of meta-features 280, where at least one of the plurality of meta-features 280 may be used as an additional ranking feature for ranking documents in response to a query by the search engine server 120.

The training server 140 acquires a set of past queries 202 from the query log 136, where each query of the set of past queries 202 has been previously submitted on the search engine server 120 by one or more users via respective associated client devices, such as the first client device 104, the second client device 106, the third client device 108, and the fourth client device 110.

How the training server 140 selects queries to be part of the set of past queries 202 is not limited. As a non-limiting example, the training server 140 may select a predetermined number of most submitted queries on the search engine server 120, most submitted recent queries on the search engine server 120 (i.e. queries having a highest number of submission for a predetermined time period before the current time), queries associated with documents having a high number of user interactions on the search engine server 120, queries having a pre-determined number or pre-determined type of search terms, and the like.

For purpose of simplification of the present specification, the meta-feature generation procedure 200 will be described for a first past query 204 of the set of past queries 202. It should be understood that the training server 140 executes the meta-feature generation procedure 200 for each past query of the set of past queries 202.

The training server 140 acquires, for the first past query 204, a set of past documents 210, the set of past documents 210 having been presented as search results in a search engine results page (SERP) to one or more of the plurality of client devices 102 in response to the first past query 204 having been submitted on the search engine server 120. The set of past documents 210 may be acquired from the tracking database 132.

The set of past documents 210 generally includes a predetermined number of documents, such as the top 100 most relevant documents that have been presented in a SERP in response to the first past query 204, as determined by the MLA 126 of the search engine server 120. In other embodiments, the set of past documents 210 may include all documents having been presented as search results in response to the first past query 204. Additionally or alternatively, the set of past documents 210 may only include documents having a number of user interactions above a predetermined threshold of user interactions.

Each respective document of the set of past documents 210 has a first plurality of features 220. The first plurality of features 220 may include at least a subset of the features having been used to rank the respective past document 212 by the MLA 126 of the search engine server 120 (i.e. some or all of features that have been used to previously rank the set of past documents 210). In some embodiments of the present technology, the first plurality of features 220 may only have features with non-predicted values (i.e. values not having been predicted by the MLA 126 of the search engine server 120).

Generally, the first plurality of features 220 may include one or more of: query-dependent features, query-independent features, and user interactions.

As a non-limiting example, the first plurality of features 220 may include query-dependent features such as one or more of:
Term frequency—Inverse document frequency (TF-IDF) of body, anchor, title, URL, and/or whole document.
BM25 of body, anchor, title, URL, and/or whole document.
LMIR.ABS of body, anchor, title, URL, and/or whole document
LMIR.DIR of body, anchor, title, URL, and/or whole document As a non-limiting example, the first plurality of features 220 may include query-independent features such as one or more of:
Web graph: connectivity in the web graph, such as number of inlinks and outlinks. Examples include: PageRank, Hyperlink-Induced Topic Search (HITS).
Document statistics: basics statistics of the document, such as a number of words in the document, number of words in a documents in-link anchor text, number of mirror copies of the document, type of encoding, and the like.
Characteristics of the URL: URL characteristics such as depth, number of visits, number of logins, number of dashes in the URL, and the like.
Type of content: a category associated with the document, such as news type, encyclopedia article, official site, and the like.

Clicks: click based features, such as click distance, probability of click, first click, last click, long dwell time click or only click, probability of skip (not clicked, but a document below is), average dwell time, and the like.

Time: time based features, such as creation time of the document, modification time of the document, and the like.

As a non-limiting example, the first plurality of features 220 may include indications of user interactions or user engagement metrics tracked and compiled by the tracking server 130 such as one or more of:

Loss/Win: was the document clicked in response to the search query or not.

Dwell time: time a user spends on a document before returning to the SERP.

Long/short click: was the user interaction with the document long or short, compared to the user interaction with other documents on the SERP.

Click-through rate (CTR): Number of clicks on an element divided by the number of times the element is shown (impressions).

Additionally, in some embodiments of the present technology, the training server 140 may retrieve respective relevance scores 230 of the set of past documents 210, i.e. a respective relevance score 232 of the respective past document 212 in the set of past documents 210 to the first past query 204, computed by the MLA 126 of the search engine server 120.

The respective relevance score 232 for the respective past document 212 may be a current relevance score, i.e. the same relevance score that the respective past document 212 would have if the first past query 204 was submitted on the search engine server 120 at the current time, where the respective relevance score 232 is indicative of a position of the respective document in a SERP. In such embodiments, the respective relevance scores 230 may be obtained by the training server 140 from the MLA 126 of the search engine server 120. In other embodiments of the present technology, the respective relevance score 232 may be a past relevance score, which is indicative of a past position of the respective past document 212 in a past SERP that was provided to one or more users of the plurality of client devices 102 in response to the first past query 204. It should be noted that documents in the set of past documents 210 may have past relevance scores that have changed over time for a variety of reasons (e.g. the document was updated to include more relevant content, and thus was considered more relevant by the MLA 126), and in such situations, the training server 140, may as a non-limiting example, compute an average of the respective past relevance scores over time.

In embodiments of the present technology where the MLA 126 is configured to execute a base-line ranking estimation step and a rank-score adjustment score step, the training server 140 may cause the MLA 126 to execute at least one of the base-line ranking estimation step and the rank-score adjustment score step for the set of past documents 210, and acquire preliminary ranking scores 240 and/or final ranking scores 250 from the MLA 126 of the search engine server 120, where the respective past document 212 may be associated with at least one of: a respective preliminary ranking score 242 and a respective final ranking score 252.

In some embodiments of the present technology, the respective relevance scores 230, preliminary ranking scores 240 and/or final ranking scores 250 may be included in the first plurality of features 220.

Having acquired the first past query 204, and the set of past documents 210, where each respective past document 212 of the set of past documents 210 has the first plurality of features 220, an optionally at least one of the relevance scores 230, the preliminary ranking scores 240 and the final ranking scores 250, the training server 140 generates the plurality of meta-features 280 for the set of past documents 210.

For purpose of simplification of the present specification, the generation of only one meta-feature, which will be referred to as the meta-feature 282, will be described. It should be understood that the training server 140 may generate two or more meta-features according to the non-limiting examples that will be provided herein below.

Generally speaking, for the respective past document 212 in the set of past documents 210, a value 284 of the meta-feature 282 is generated based on: a value 224 of a given feature 222 the first plurality of features 220 for the respective past document 212, and a value 262 of a parameter 260 associated with the set of past documents 210.

The given feature 222 may be any feature of the first plurality of features 220. In some embodiments of the present technology, the training server 140 may be configured to consider only one of: query-dependent features, query-independent features, and user interactions in the first plurality of features 220 as the given feature 222. Additionally or alternatively, the first plurality of features may be absolute features. The value 224 of the given feature 222 is a numerical value of the given feature 222 for the respective past document 212. Additionally or alternatively, values of the given feature 222 for the set of past documents 210 may be restricted to values not having been predicted by the MLA 126 of the search engine server 120, but to "real" values (such as a value of a CTR having been determined based on past user interaction data, and not a value of the CTR predicted by the MLA 126).

The nature of the parameter 260 associated with the set of past documents 210 is not limited. Generally speaking, the parameter 260 can be a parameter that is used by the MLA 126 for ranking the set of past documents 210, or a parameter having been output by the MLA 126 as a result of ranking the set of past documents 210 (such as during a base-line ranking estimation step for example). Thus, the parameter 260 may be, as a non-limiting example, for the respective past document 212, respective values of one or more other features of the first plurality of features 220, respective values of one or more features not being part of the first plurality of features 220, the respective relevance score 232, the respective preliminary ranking score 242, the respective final ranking score 252, and the like. The parameter 260 may be associated with the respective past document 212, with one or more other documents of the set of past documents 210 (such as documents having been ranked above and/or below the respective past document 212 as an example), or with the set of past documents 210 as a whole. As a non-limiting example, a value 262 of the parameter 260 for the respective past document 212 may be: a value of the given feature 222 for at least one other document of the set of past documents 210, a highest value of the given feature 222 in the set of past documents 210, an average value of the given feature 222 for the set of past documents 210, a standard deviation value of the given feature 222 for the set of past documents 210, the respective preliminary ranking score 242 of the respective past document 212 in the set of past documents 210, and the like.

The training server 140 determines the value 284 of the meta-feature 282 for the respective past document 212 based on: the value 224 of a given feature 222 for the respective past document 212, and the value 262 of the parameter 260 associated with the set of past documents 210.

As a first non-limiting example, the training server 140 may determine, for the given feature 222 in the set of past documents 210: a minimum value, a maximum value, and an average value, and use at least one of the minimum value, maximum value and average value as the value 262 of the parameter 260. The training server 140 then computes the value 284 of the meta-feature 282 based on the value 262 of the parameter and the value 224 of the given feature 222. The meta-feature 282 may be a relative feature i.e. its value is computed in relation to the value 224 of the given feature 222 and values of the given feature 222 for other document or values other features.

As a second non-limiting example, the training server 140 may compute, for the given feature 222 in the set of past documents 210, a relative value of the given feature 222, i.e. for each of respective document of the set of past documents 210, a respective value of the given feature 222 is divided by a maximal value of the given feature 222 in the set of past documents 210.

As a third non-limiting example, a value of the meta-feature 282 for the respective past document 212 may be determined by equation (1):

$$f_m = \frac{f_{ij} - avg(f_j)}{std(f_j)} \qquad (1)$$

Where $f_m$ is a value 284 of the meta-feature 282 for the respective past document 212, $f_{ij}$ is the value 224 of the given feature 222 for the respective past document 212, $avg(f_j)$ is an average of the given feature 222 for the set of past documents 210, and $std(f_j)$ is a standard deviation of the given feature 222 for the set of past documents 210. Thus, in equation (1), the parameter 260 may be based on the average and the standard deviation of the given feature 222 for the set of past documents 210.

As a fourth non-limiting example, the training server 140 may select a subset of past documents (not depicted) from the set of past document 210, the subset of past documents having a predetermined number of documents having a highest value of the given feature 222. The training server 140 may sort the subset of past documents 210 from highest to lowest value of the given feature 222. The training server 140 may then use a respective position of each past document of the subset of documents as the value 284 of the meta-feature 282.

As a fifth non-limiting example, the training server 140 may rank the set of past documents 210 according to values of the given feature 222, and may select a subset of past documents (not depicted) based on the values of the given feature, the subset of past documents having a predetermined number of documents having a highest value of the given feature 222. The training server 140 may then compute an average value of another given feature (not numbered) for the subset of past documents, and use the average value as the value 284 of meta-feature 282, where the value 284 of the meta-feature 282 is static, i.e. a value of the meta-feature 282 is the same for all of the subset of past documents.

Further, in some embodiments of the present technology, the training server 140 may normalize values of the meta-feature 282, such that values of the meta-feature 282 are between 0 and 1.

The training server 140 stores, in the training database 142, for each respective document 212 in the set of past documents 210 associated with the first past query 204, a respective value 284 of the meta-feature 282. In other embodiments, the value 284 of the meta-feature 282 for each respective document 212 of the set of past documents 210 may be stored together with the first plurality of features 220 in the index 124 and/or the query log 136 and/or the user interaction log 138.

Figure 3:
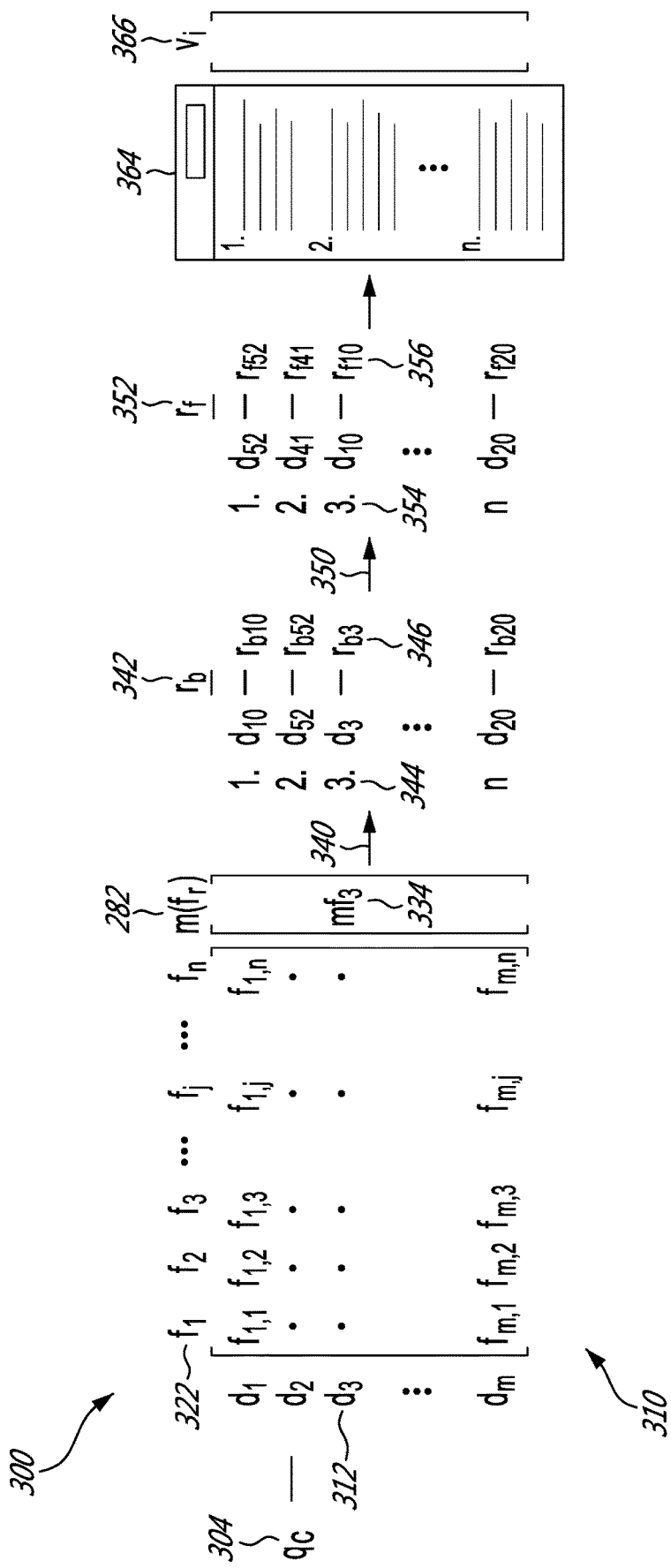
FIG. 3 and FIG. 4 depict a schematic diagram of a validation procedure executable within the system of FIG. 1 in accordance with non-limiting embodiments of the present technology.
Figure 4:
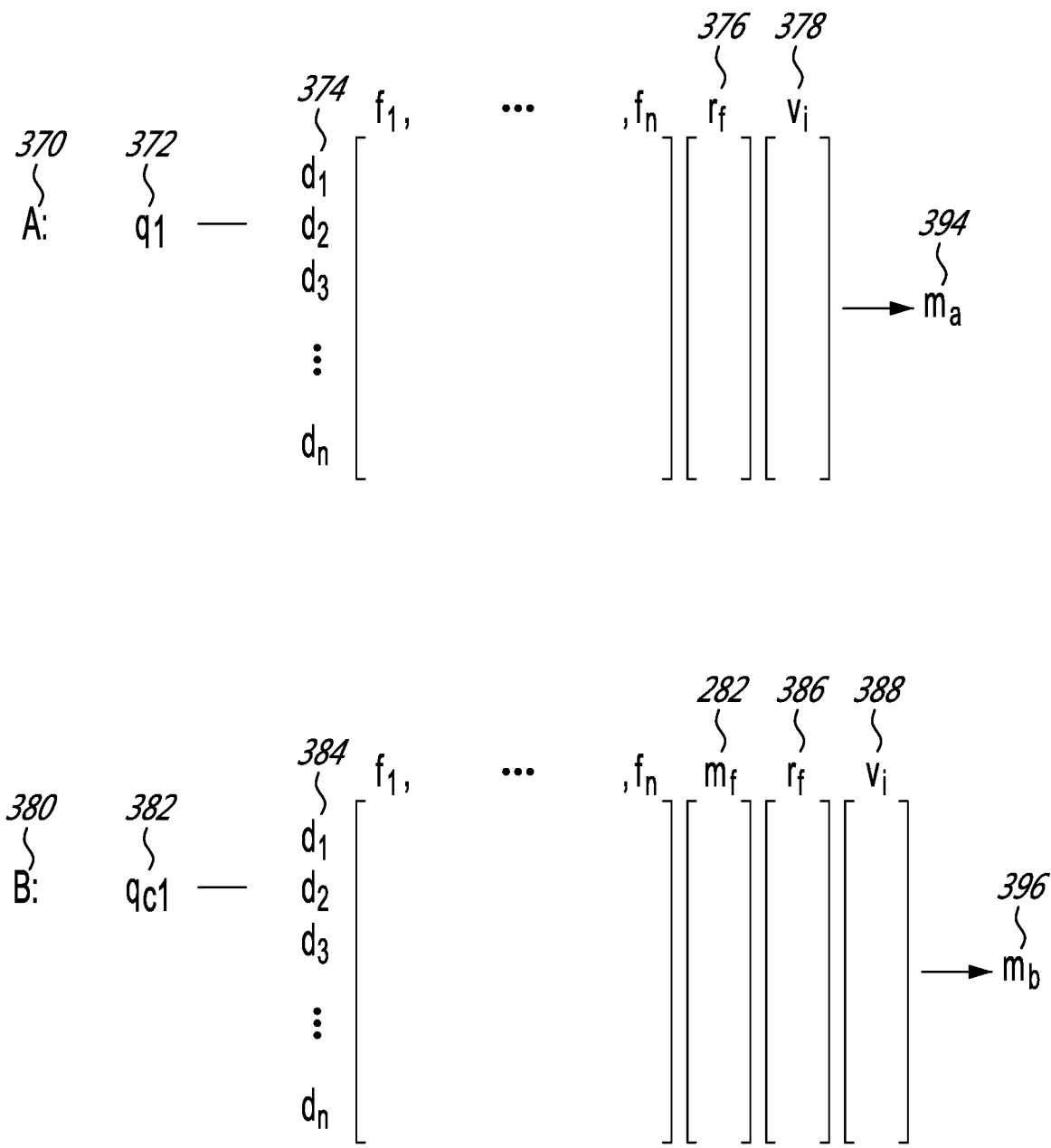

With reference to FIG. 3 and FIG. 4, there is depicted a validation procedure 300 of the meta-feature 282, the validation procedure 300 being executed by the training server 140 in accordance with non-limiting embodiments of the present technology.

To execute the validation procedure 300, the training server 140 is configured to: (i) acquire user interaction data for documents having been presented to one or more users, where the documents have been ranked based at least in part on the meta-feature 282; and (ii) validate the meta-feature 282 based on a determined usefulness of the meta-feature 282 for ranking the documents.

Generally speaking, before, and during the execution of the meta-feature generation procedure 200, the search engine server 120 continues providing document as search results in response to queries to the plurality of client devices 102. After the execution of the meta-feature generation procedure 200, the search engine server 120 continues providing documents in response to queries from the plurality of client devices 102, but is also configured to take into account the previously generated meta-feature 282 for ranking documents when providing search results in response to one or more current queries similar to a past query in the set of past queries 202.

The search engine server 120 receives a current query 304 from one of the plurality of client devices 102, such as the first client device 104. The search engine server 120 retrieves, from the index 124, based on terms of the current query 304, a set of current documents 310 relevant to the current query 304, the set of current documents 310 having a first plurality of features 322 (which may be the first plurality of features 220 of FIG. 2, or may have fewer or more features). As an example, if the current query 304 is the first past query 204, the set of current documents 310 may be the same as the set of past documents 210, or may be a subset of the set of past documents 210 (e.g. if one or more documents past documents have been deleted by their operators). In other embodiments of the present technology, the set of current documents 310 may include the set of past documents 210 and additional documents, such as document have been recently crawled and added to the index 124 by the search engine server 120.

The search engine server 120 may query the training database 142 to verify if the current query 304 is one of the set of past queries 202, in which case the search engine server 120 also retrieves respective values 334 of a meta-feature 282 computed for the respective set of past documents (not depicted) associated with the respective past query (not depicted) similar to the current query 304, which will be used for ranking the set of current documents 310, the set of current documents 310 including documents in the set of past documents. In other embodiments of the present technology, the meta-feature 282 may be retrieved together with the first plurality of features 322 by the training server 140. In yet further non-limiting embodiments, the plurality of meta-features 280 or the meta-feature 282 can be calculated as part of the validation procedure 300. The later is particularly applicable but not so limited, where the current query 304 is not part of the set of past queries 202.

The search engine server 120 executes ranking of the set of current documents 310 based at least in part on the meta-feature 282 and the first plurality of features 322. As a non-limiting example, the search engine server may be configured to execute ranking of the set of current documents 310 in two steps: a base-line relevance estimation step 340, and a rank-adjustment score determination step 350. It is contemplated that in other embodiments of the present technology, the ranking of the set of current documents 310 may be executed in more steps, or in a single step.

As explained herein above, the base-line relevance estimation step 340 is generally used to estimate a relevance of respective current document 312 in the set of current documents 310 to the current query 304, which may be executed based on some or all of the respective values of the first plurality of features 322, and the respective value 334 of the meta-feature 282. The search engine server 120 generates a preliminary ranked list of documents 342 where each respective current document 312 of the set of current documents 310 is associated with a respective preliminary rank 344 based on a respective preliminary ranking score 346.

The search engine server 120 executes the rank-adjustment score determination step 350, which is generally used for generating a final ranked list of documents 352 from the preliminary ranked list of documents 342. The rank-adjustment score determination step 350 may be executed based on the meta-feature 282, and one or more of the first plurality of features 322, and the respective preliminary rank 344 and/or the respective preliminary ranking score 346. The execution of the rank-adjustment score determination step 350 may result in the search engine server 120 re-ranking documents with respect to one another at least partially based on the respective preliminary rank 344 and/or the respective preliminary ranking score 346. This means that at least one document of the preliminary ranked list of documents 342 following such a re-ranking of the documents, may be associated with a respective final rank 354 in the final ranked list of documents 352 that is different from its respective preliminary rank 344 in the preliminary ranked list of documents 342.

It is contemplated that in some embodiments of the present technology, the execution of the rank-adjustment score determination step 350 may allow generating by the search engine server 120, respective final ranking scores 356 for documents to be provided in a SERP that, in a sense, "boost" respective preliminary ranking scores 346 of the respective documents due to the meta-feature 282. As a result, some documents in the final ranked list of documents 352 may have different respective final ranks following this "boosting" based on the meta-feature 282, as compared to their respective preliminary ranks 344. This may result in generation of a more useful SERP as a whole in response to the current query 304.

The search engine server 120, as part of at least one of: the base-line relevance estimation step 340, and the rank-adjustment score determination step 350, is configured to consider the previously computed or computed on the fly meta-features 282 for ranking the set of current documents 310. Thus, the set of current documents 310 are ranked by the MLA 126 based at least in part on the meta-feature 282, to generate a final list of ranked documents 352, which may result in one or more documents being ranked differently (i.e. having a higher or a lower rank) than they would have been ranked by the MLA without the meta-feature 282.

The search engine server 120 outputs the final ranked list of documents 352, which is then transmitted to the first client device 104 to be displayed as a SERP 364.

The search engine server 120 may store an indication of: the current query 304, the final ranked list of documents 352, and values of the meta-feature 282 having been used for ranking the set of current documents 310 in the training database 142, and/or the query log 136 and/or the user interaction log 138.

The tracking server 130 tracks user interactions of the user of the first client device 104 with the SERP 364. The tracking server 130 stores the tracked user interactions 366 with the indication of the current query 304, the final ranked list of documents 352, and values of the meta-feature 282.

The search engine server 120 continues the above procedure for each current query that is also in the set of past queries 202. In embodiments where two or more meta-features have been generated, the search engine server 120 also stores each of the two or more meta-features, and may repeat the procedure one by one for each of the two or more meta-features.

Once enough user interaction data is acquired by the tracking server 130 (e.g. a number of user interactions over a predetermined threshold) for documents having been ranked based at least in part on the meta-feature 282 in response to current queries similar to one of the set of past queries 202, the training server 140 executes validation of the meta-feature 282 by determining its usefulness.

Generally speaking, the usefulness of the meta-feature 282 may be determined by executing A/B testing. An A/B test compares two variants of a service at a time, usually its current version (a control version 370) and a new one (a test version 380 having an experimental treatment applied thereto), by exposing them to two groups of users. One aim of the controlled A/B experiments is to detect the causal effect on user engagement of experimental treatments applied to the web service. Thus, in the context of the present technology, for a current query 382 similar to one of the set of past queries 202, the A or control version 370 may include: a respective set of past documents 374 associated with a respective past query 372, where the respective set of past documents 374 has respective final ranking scores 376, and user interactions 378 with the respective set of past documents 374 tracked by the tracking server 130, the respective final ranking scores 376 having been determined by the MLA 126 not based on the meta-feature 282.

The B or test version 380 may be a respective current query 382 similar to the respective past query 372, with a respective set of current documents 384 similar to the respective set of past documents 374, the respective set of current documents 384 having been ranked based at least in part on a meta-feature 282 to obtain respective final ranks 386, and user interactions 388 with the respective set of current documents 384 tracked by the tracking server 130.

It should be noted that A/B testing may be applied on a per query basis and the results may be compiled for the set of past queries 202 to obtain an "aggregated" usefulness.

In other embodiments of the present technology, the control version 370 (i.e. providing documents without ranking them based on the meta-feature 282) may be acquired at the same time as the test version (i.e. providing documents by ranking them based on the meta-feature 282), where the control version 370 may be provided to a first group of users (such as the first client device 104 and the second client device 106 for example) and the test version 380 may be provided to a second group of users (such as the third client device 108 and the fourth client device 110 for example).

The training server 140 then applies one or more evaluation metrics to evaluate the causal effect on user engagement by the addition of the meta-feature 282. A type of the evaluation metric used to evaluate the usefulness of the meta-feature 282, and a type of the user interactions 378 and user interactions 388 being evaluated is not limited, and several techniques to evaluate user engagement known in the art may be used.

The training server 140 applies a control evaluation metric 394 on the respective set of past documents 374 based on the respective final ranking scores 376 and the user interactions 378 to obtain a usefulness threshold.

The training server 140 applies a test evaluation metric 396 on the respective set of current documents 384 based on the respective user interactions 388, and the respective final ranks 386, where the respective final ranks 386 have been computed based at least in part on the meta-feature 282, to obtain the usefulness of the meta-feature 282.

The training server 140 compares the usefulness of the meta-feature 282 to the usefulness threshold.

The usefulness of the meta-feature 282 being above the usefulness threshold, i.e. the test evaluation metric 396 being above the control evaluation metric 394, may indicate that the meta-feature 282 has a positive effect on user engagement on the search engine server 120.

The usefulness of the meta-feature 282 being below the usefulness threshold, i.e. the test evaluation metric 396 being below the control evaluation metric 394, may indicate that the meta-feature 282 has no effect on user engagement and/or has a negative effect on user engagement on the search engine server 120.

In response to the test evaluation metric 396 being above the control evaluation metric 394, the training server 140 selects the meta-feature 282 as a feature for ranking documents, and train the MLA 126 of the search engine server 120 to generate and consider the meta-feature 282 for ranking documents in response to new queries, where the new queries are queries that not part of the set of past queries 202.

It should be noted that more than one control evaluation metric 394 and test evaluation metric 396 may be applied to determine the usefulness of the meta-feature 282 and the usefulness threshold.

The validation procedure 300 may be repeated for each one the plurality of meta-features 280. It is contemplated that the training server 140 may only select a meta-feature among the plurality of meta-features 280 that has a highest respective usefulness compared to its respective usefulness threshold, i.e. a meta-feature that has a highest difference between its respective test evaluation metric and its respective control evaluation metric, and thus the most effect on user engagement with documents provided in response to queries on the search engine server 120 by ranking the documents based on the meta-feature.

Additionally or alternatively, it is contemplated that human assessor(s) may also be used to judge the usefulness of the meta-features by reviewing the SERP(s) provided in response to queries, and additional evaluation metrics may also be applied in accordance with non-limiting embodiments of the present technology.

Figure 5:
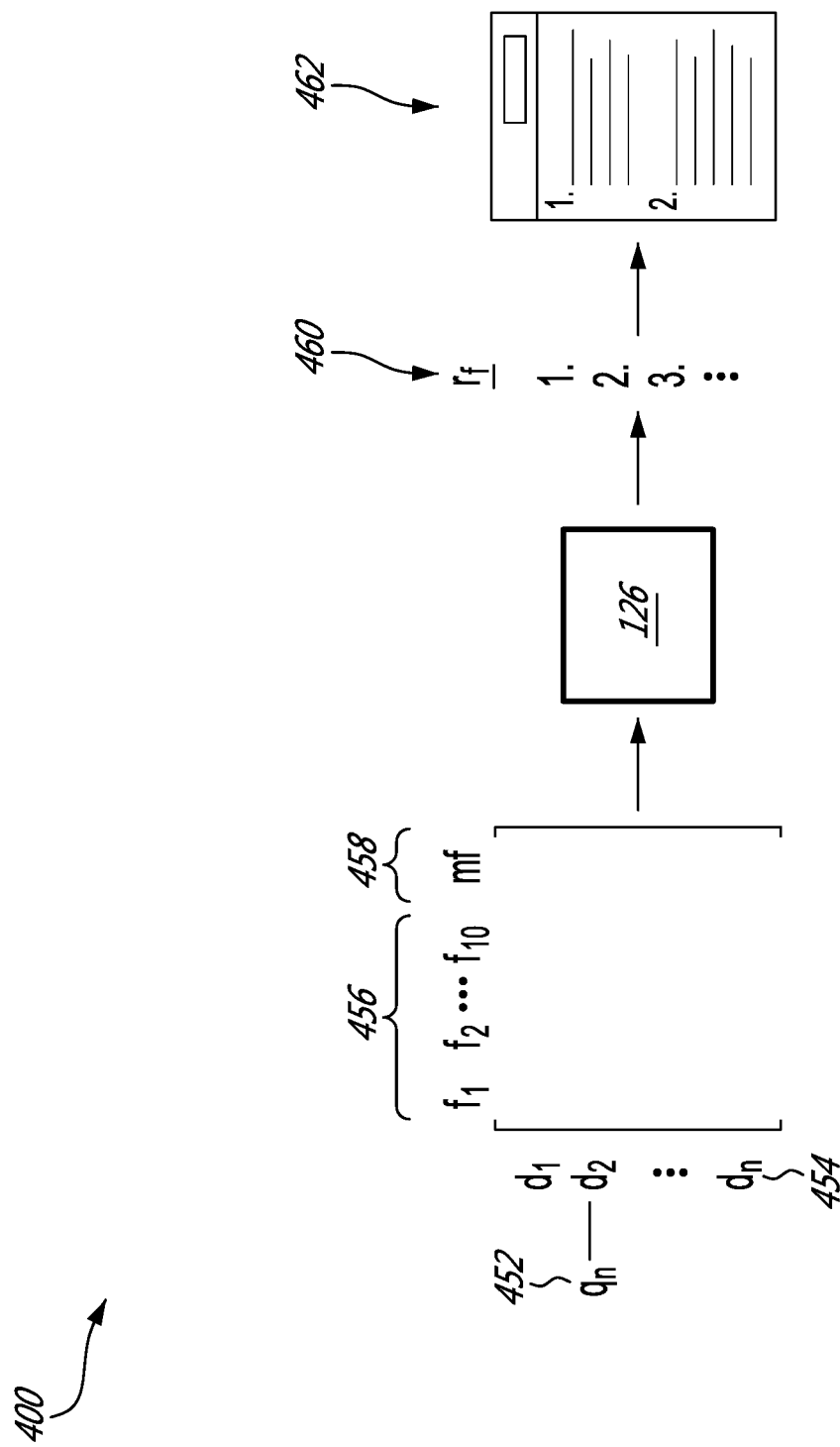
FIG. 5 depicts a schematic diagram of an in-use procedure executable within the system of FIG. 1 in accordance with non-limiting embodiments of the present technology.

Now turning to FIG. 5, there is depicted an in-use procedure 400 of the MLA 126 of the search engine server 120 executed by the training server 140 in accordance with non-limiting embodiments of the present technology.

Prior to executing the in-use procedure 400, the training server 140 executes a training procedure (not depicted), for training the MLA 126 of the search engine server 120 to generate and use the selected meta-feature 282. The training procedure may be executed according to techniques known in the art. After execution of the training procedure, the MLA 126 incorporates the meta-feature 282 into its ranking formula, which may become part of the first plurality of features 428.

The in-use procedure 400 is executed by the search engine server 120 after having trained the MLA 126 during the training procedure 400.

The search engine server 120 receives a new query 452 from the second client device 106, where the new query 452 is not among the set of past queries 202, i.e. the new query 452 is not associated with a set of documents for which the selected meta-feature 282 has been previously generated.

The search engine server 120 retrieves, from the index 124, based on terms of the new query 452, a set of documents 454 relevant to the new query 452, the set of documents 454 having a first plurality of features 456.

The MLA 126 generates values of a meta-feature 458 for each respective document of the set of documents 454.

The MLA 126 executes a base-line relevance estimation step (not depicted), and a rank-adjustment score determination step (not depicted), based on the first plurality of features 456 and the meta-feature 458, to obtain a final ranked list of documents 460 relevant to the new query 452.

The MLA 126 transmits the final ranked list of documents 460, which is presented as a SERP 462 to the user of the second client device 106.

Figure 6:
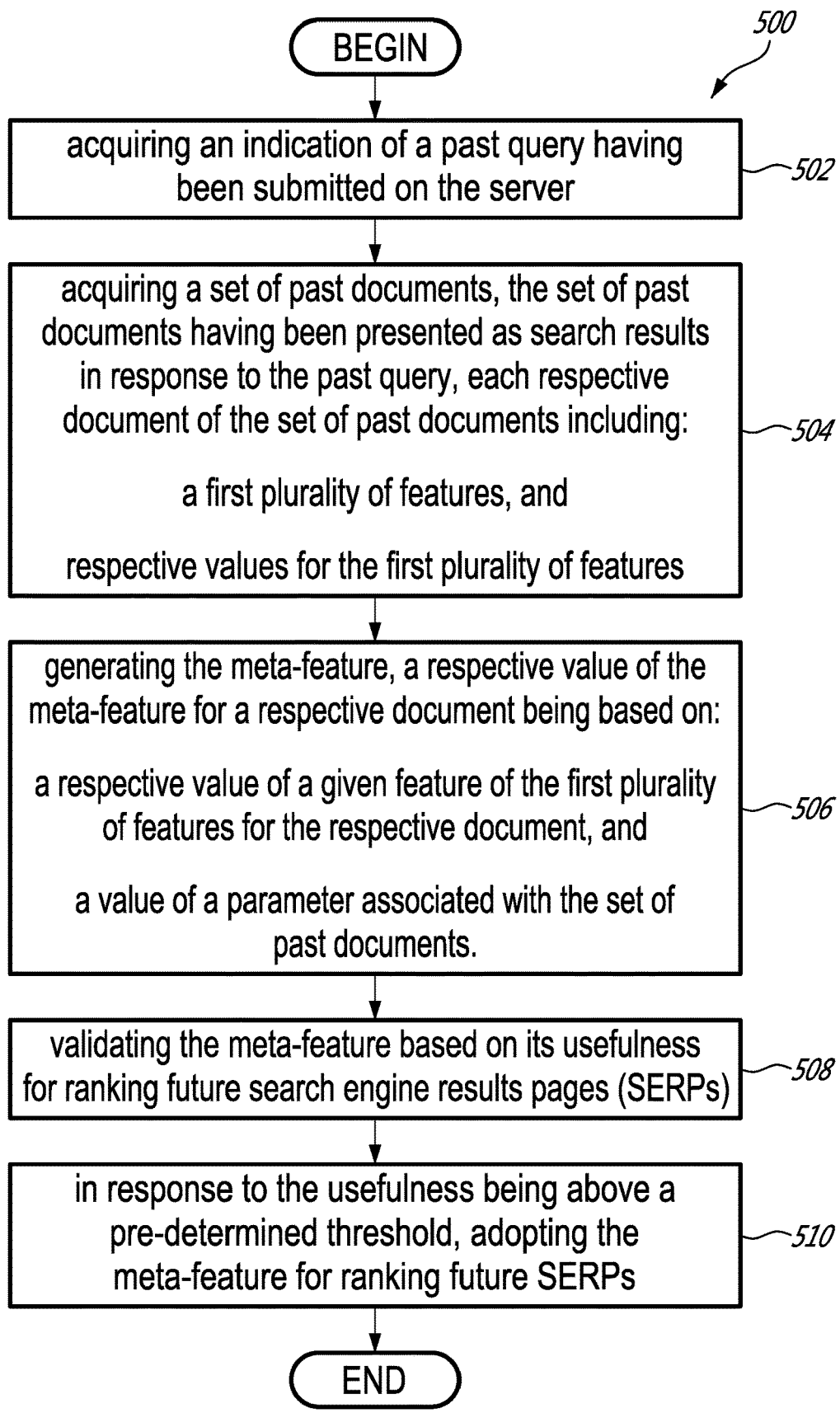
FIG. 6 depicts a block diagram of a method for generating a meta-feature for ranking documents, the method executable within the system of FIG. 1 in accordance with non-limiting embodiments of the present technology.

FIG. 6 depicts a block diagram of a method 500 for generating the meta-feature 282 for ranking documents in accordance with non-limiting embodiments of the present technology.

The method 500 is executed by the training server 140. The method 500 may be executed offline, and at predetermined intervals of time, e.g. every 6 month, by the training server 140.

The method 500 begins at step 502.

Step 502: Acquiring an Indication of a Past Query Having been Submitted on the Server At step 502, the training server 140 acquires, from the query log 136 of the tracking database 132, an indication of a first past query 204, the first past query 204 having been submitted by at least one of the plurality of electronics devices 102.

The method 500 advances to step 504.

STEP 504: acquiring a set of past documents, the set of past documents having been presented as search results in response to the past query, each respective document of the set of past documents including:
a first plurality of features, and
respective values for the first plurality of features At step 504, the training server 140 acquires, from the query log 136 of the tracking database 132 and/or the index 124, based on the first past query 204, a set of past documents 210, the set of past documents 210 having been presented in a SERP transmitted to at least one of the plurality of electronics devices 102 in response to the first past query 204. A respective past document 212 of the set of past documents 210 has a first plurality of features 220, and values for each of the first plurality of features 220. The respective past document 212 of the set of past documents 210 is associated with one or more user interactions, the one or more user interactions having been performed by users of the plurality of client devices 102 having submitted the first past query 204 on the search engine server 120.

The method 500 advances to step 506.

STEP 506: generating the meta-feature, a respective value of the meta-feature for a respective document being based on:
- a respective value of a given feature of the first plurality of features for the respective document, and
- a value of a parameter associated with the set of past documents.

At step 506, the training server 140 generates a meta-feature 282, where the value 284 of the meta-feature 282 for the respective past document 212 is based on: a respective value 224 of a given feature 222 of the first plurality of features 220, and a value 262 of a parameter 260 associated with the set of past documents 210. The parameter 260 can be a parameter that is used by the MLA 126 for ranking the set of past documents 210, or a parameter having been output by the MLA 126 as a result of ranking the set of past documents 210. In some embodiments of the present technology, the parameter 260 may be at least one of: a respective preliminary ranking score 242 of the given document, a value of the given feature 222 of at least one other document of the set of past documents 210, and another value of another feature associated with one of the respective past document 212 and at least one other document.

The training server 140 is configured to execute steps 502 to 506 for each past query of the set of past queries 202 having been submitted on the search engine server 120.

The method advances to step 508.

Step 508: Validating the Meta-Feature Based on its Usefulness for Ranking Future Search Engine Results Pages (SERPs)

At step 508, with continuing reference to FIG. 5 and to FIG. 6, the training server 140 executes validation of the meta-feature 282 by executing method 600.

The training server 140 executes method 600 before executing step 510.

Step 510: In Response to the Usefulness being Above a Pre-Determined Threshold, Adopting the Meta-Feature for Ranking Future SERPs At step 510, in response to the usefulness of the meta-feature 282 being above the usefulness threshold, i.e. in response to the test evaluation metric 396 being above the control evaluation metric 394, the training server 140 adopts the meta-feature 282 to train the MLA 126 of the search engine server 120, such that the meta-feature 282 becomes a feature taken into account by the MLA 126, akin to the first plurality of meta-features 282.

The training server 140 may generate a respective training object 422 of the set of training objects 420 by retrieving from the training database 142 and/or the query log 136 and/or the user interaction log 138, a respective past query 424 (e.g. one of the set of past queries 202) associated with a respective set of past documents 426 having been presented in response to the respective past query 424, the respective set of past documents 426 having a respective first plurality of features 428, and respective values of the selected meta-feature 282 for the respective set of past documents 426, respective final rankings 432 and user interactions 434 with the respective set of past documents 426.

The training server 140 trains the MLA 126 of the search engine server 120 on the set of training objects 420, by using respective user interactions 434 as a label, such that the MLA 126 generates the meta-feature 282 for documents in response to a new query that is not part of the set of past queries 202, and ranks the documents based at least in part on the predicted values of the meta-feature 282. In some embodiments of the present technology, the training of the MLA 126 may be performed for at least one of: for the base-line relevance estimation step (not depicted), and the rank-adjustment score determination step (not depicted).

If the usefulness of the meta-feature 282 is above the predetermined threshold, the tracking server 130 is configured to execute method 700.

If the usefulness of the meta-feature 282 is below the predetermined threshold, the tracking server 130 executes the method 500 for a plurality of meta-features, until the usefulness of a given meta-feature is above the predetermined threshold.

The method 500 then ends.

Figure 7:
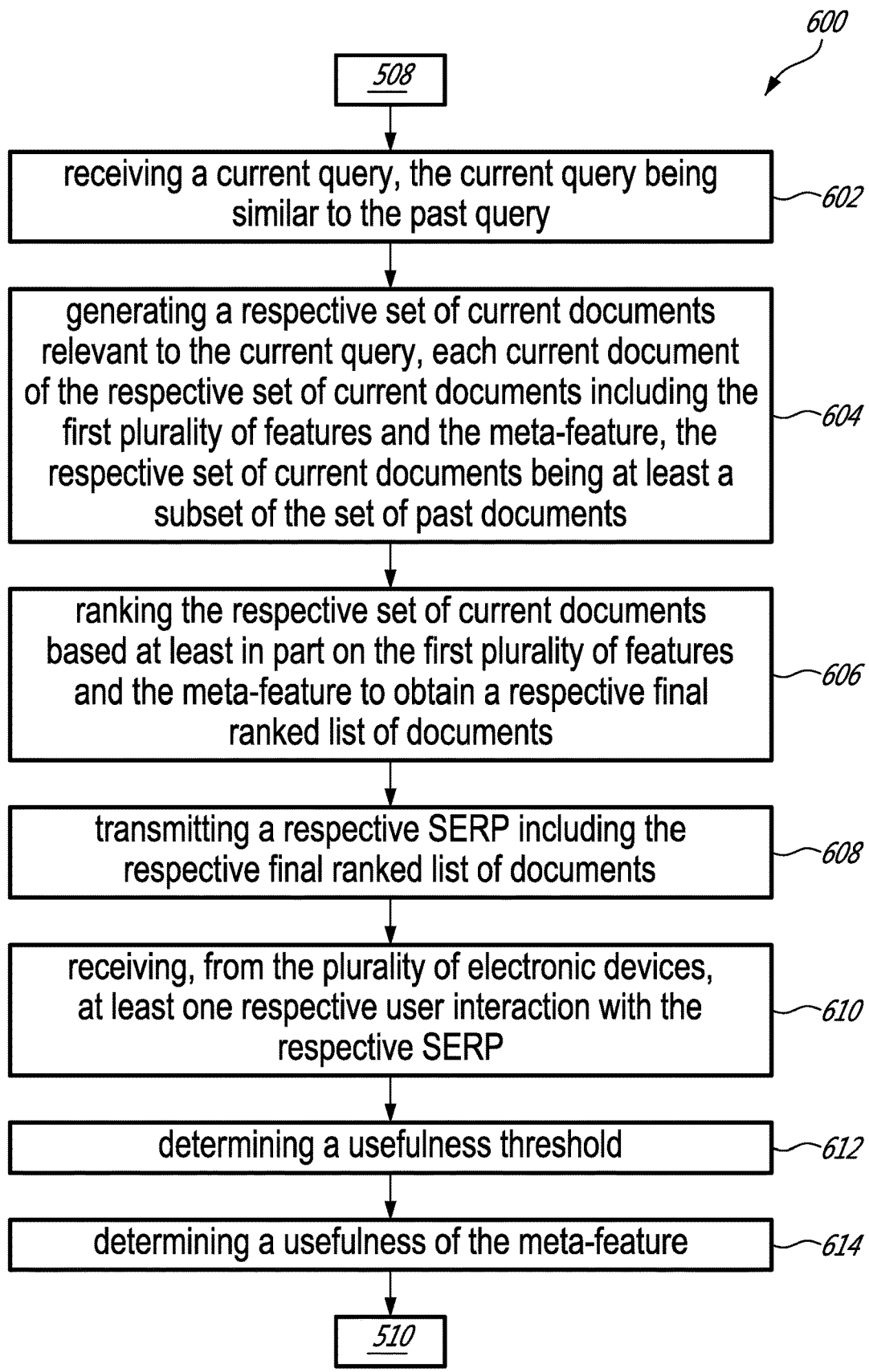
FIG. 7 depicts a block diagram of a method for training a machine-learning algorithm to rank documents based at least in part on the meta-feature, the method executable within the system of FIG. 1 in accordance with non-limiting embodiments of the present technology.

FIG. 7 depicts a block diagram of a method 600 for validating the meta-feature 282 in accordance with non-limiting embodiments of the present technology.

The method 600 is executed by the search engine server 120, the tracking server 130, and the training server 140.

The method 600 begins at step 602.

Step 602: Receiving a Current Query, the Current Query being Similar to the Past Query;

At step 602, the search engine server 120 receives from one the plurality of client devices 102, a current query 304, the current query 304 being one of the set of past queries 202. The current query 304 may be received by the search engine server 120 at different moments in time from different client devices of the plurality of client devices 102.

The method 600 advances to step 604.

Step 604: Generating a Respective Set of Current Documents Relevant to the Current Query, Each Current Document of the Respective Set of Current Documents Including the First Plurality of Features and the Meta-Feature, the Respective Set of Current Documents being at Least a Subset of the Set of Past Documents At step 604, the search engine server 120 generates a set of current documents 310 relevant to the current query 304, by querying the index 124. The set of current documents 310 has the first plurality of features 322. The search engine server 120 may have an indication that the set of current documents 310 is associated with the meta-feature 282, and retrieve the meta-feature 282 where values have been computed for a set of past documents similar to the set of current documents 310 from the training database 142 or another database (not depicted). In other embodiments of the present technology, the meta-feature 282 may be stored together with the first plurality of features 220. The search engine server 120 executes step 604 every time the current query 304 is received from one of the plurality of client devices 102.

The method 600 advances to step 606.

Step 606: Ranking the Respective Set of Current Documents Based at Least in Part on the First Plurality of Features and the Meta-Feature to Obtain a Respective Final Ranked List of Documents;

At step 606, the MLA 126 of the search engine server 120 executes ranking of the set of current documents 310 based at least in part on the first plurality of features 322 and the meta-feature 282 to obtain a respective final ranked list of current documents 352. In some embodiments of the present technology, the ranking of the set of current documents 310 may be executed in two steps: a base-line relevance estimation step 340 and a rank-adjustment score determination step 350. The search engine server 120 executes step 606 every time the current query 304 is received from one of the plurality of client devices 102.

The method 600 advances to step 608.

Step 608: Transmitting a Respective SERP Including the Respective Final Ranked List of Documents At step 608, the search engine server 120 generates a SERP 364 based on the respective final ranked list of current documents 352, and transmits to the one of the plurality of client devices 102, the respective SERP 364. The search engine server 120 executes step 608 every time the current query 304 is received from one of the plurality of client devices 102.

The method 600 advances to step 610.

Step 610: Receiving, from the Plurality of Electronic Devices, at Least One Respective User Interaction with the Respective SERP At step 610, the search engine server 120 receives, from the one of the plurality of client devices 102, user interactions 366 with the respective SERP 364. The user interactions 366 with the respective SERPs 364 are tracked by the tracking server 130, and may be received at different points in time. The tracking server 130 stores the user interactions 366 in association with the final ranked list of documents 352 in the SERP 364 and the current query 304 in the training database 142.

The method 600 advances to step 612.

Step 612: Determining a Usefulness Threshold

At step 612, the training server 140 determines a usefulness threshold to validate the meta-feature 282. The training server 140 determines the usefulness threshold based on on the respective final ranking scores 376 and the respective user interactions 378 with respective sets of past documents 374 provided in response to respective past queries 202 by applying the control evaluation metric 394. The respective sets of past documents 374 have been ranked without taking into account the meta-feature 282.

Step 614: Determining a Usefulness of the Meta-Feature

At step 614, the training server 140 applies a test evaluation metric 396 on the respective set of current documents 384 based on the respective user interactions 388, and the respective final ranks 386 having been computed based at least in part on the meta-feature 282 to determine the usefulness of the meta-feature 282.

The method 600 then ends, and goes back to step 510.

Figure 8:
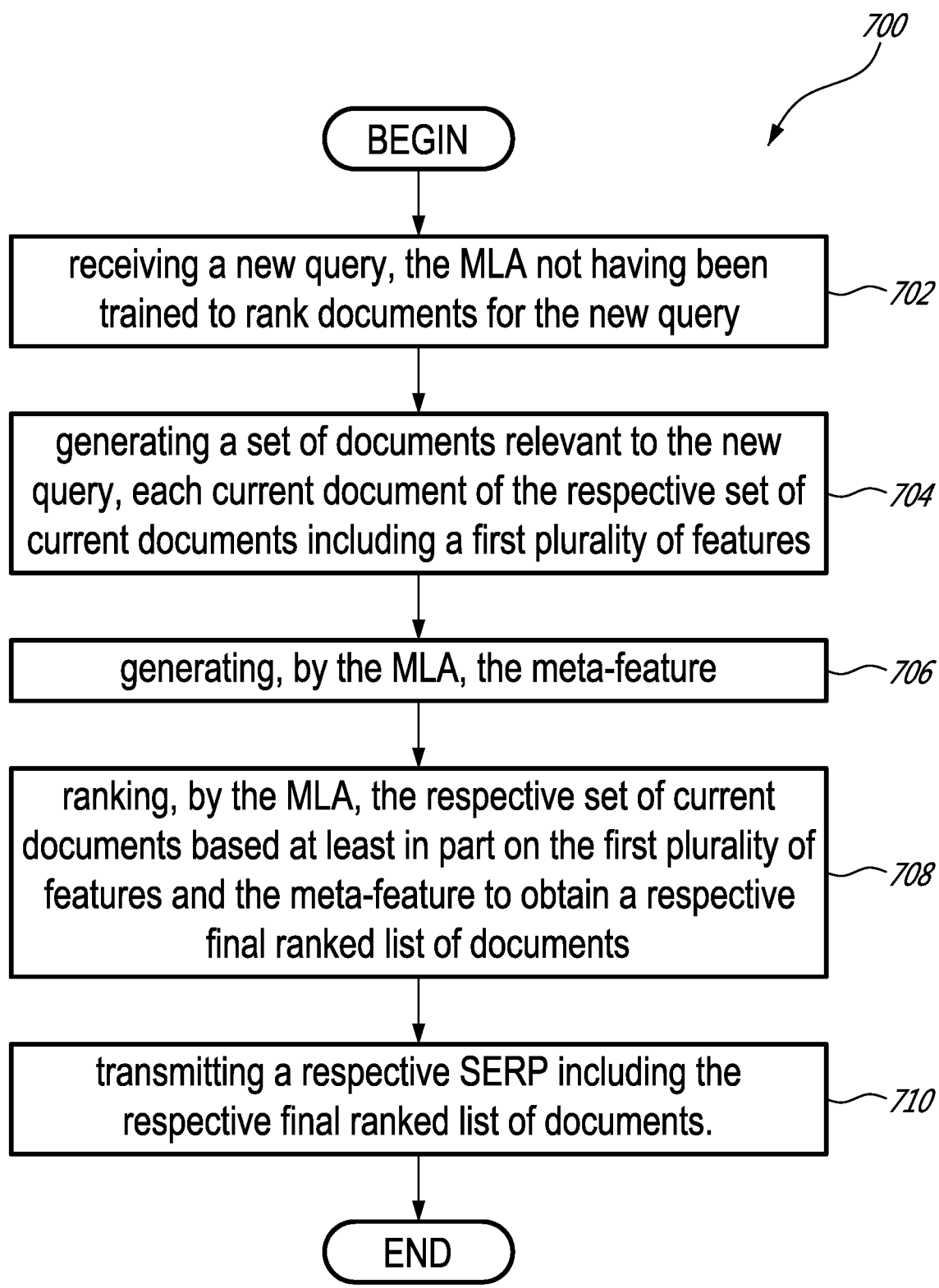
FIG. 8 depicts a block diagram of a method for ranking documents using the meta-feature, the method executable within the system of FIG. 1 in accordance with non-limiting embodiments of the present technology.

FIG. 8 depicts a block diagram of a method 700 for ranking documents by the MLA 126 using the meta-feature 282, the MLA 126 having been trained to generate the meta-feature 282, the method executable by the search engine server 120 in accordance with non-limiting embodiments of the present technology.

The method 700 is executed after the method 500.

The method 700 begins at step 702.

Step 702: Receiving a New Query;

At step 702, the search engine server 120 receives a new query 452 from the second client device 106, where the new query 452 is not among the set of past queries 202, i.e. the new query 452 is not associated with a set of documents for which the selected meta-feature 282 has been previously generated.

The method 700 advances to step 704.

Step 704: Generating a Set of Documents Relevant to the New Query, Each Current Document of the Respective Set of Current Documents Including a First Plurality of Features At step 704, the search engine server 120 retrieves, from the index 124, based on terms of the new query 452, a set of documents 454 relevant to the new query 452, the set of documents 454 having a first plurality of features 456.

The method 700 advances to step 706.

Step 706: Generating the Meta-Feature

At step 706, the MLA 126 or the search engine server 120 generates values of the meta-feature 458 for each respective document of the set of documents 454.

The method 700 advances to step 708.

Step 708: Ranking, by the MLA, the Respective Set of Current Documents Based At Least in Part on the First Plurality of Features and the Meta-Feature to Obtain a Respective Final Ranked List of Documents At step 708, the MLA 126 ranks the set of documents 454 based at least in part on the first plurality of features 456 and the meta-feature 458, to obtain a final ranked list of documents 460 relevant to the new query 452.

The method 700 advances to step 710.

Step 710: Transmitting a Respective SERP Including the Respective Final Ranked List of Documents.

At step 710, the MLA 126 transmits the final ranked list of documents 460, which is presented as a SERP 462 to the user of the second client device 106.

The method 700 then ends.

In some embodiments of the present technology, the meta-feature may be generated on the go, i.e. each time a query is received, without previously computed values of the meta-feature. Documents may be pre-ranked based on absolute features to obtain a preliminary ranked list of documents. The preliminary ranked list of documents may be re-ranked the documents based on at least one meta-feature, which is a relative feature based on at least one absolute feature.

It should be apparent to those skilled in the art that at least some embodiments of the present technology aim to expand a range of technical solutions for addressing a particular technical problem, namely improving ranking of a set of search results in response to a given query by generating a meta-feature, which may allow improving ranking of certain search results in the set of search results. Such technical solutions may allow saving resources such as storage space, bandwidth and time on client devices, as well as on the search engine server.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for generating a meta-feature for ranking documents by a machine learning algorithm (MLA) executed by a server, the method executable by the server, the method comprising:

acquiring, by the server, an indication of a past query having been submitted on the server;
acquiring, by the server, a set of past documents, the set of past documents having been presented as search results in response to the past query, each past document of the set of past documents including:
a first plurality of features having been used for ranking past documents in the set of past documents, and respective values for the first plurality of features;
generating, by the server, the meta-feature, a respective value of the meta-feature for a given past document being a relative value between a respective value of a given feature of the first plurality of features for the given past document and at least one other respective value of the given feature associated with other ones of the set of past documents;
validating, by the server, the meta-feature based on a usefulness thereof for ranking future search engine results pages (SERPs),
the usefulness of the meta-feature being determined by comparing, by the processor, user interactions with:
(i) a current ranking of the set of past documents and
(ii) a new ranking of the set of past documents, the new ranking being based at least on the meta-feature;
in response to the usefulness of the meta-feature being above a predetermined threshold, generating a plurality of training objects for training the MLA for ranking future SERPs,
a given training object of the plurality of training objects including: (i) the indication of the past query; (ii) the given past document of the set of past documents; (iii) the respective values of the first plurality of features associated therewith; and (iv) the respective value of the meta-feature associated therewith.

2. The method of claim 1, wherein
the set of past documents is associated with past user interactions; and wherein the method further comprises prior to the validating:
determining, by the server, the threshold based on the past user interactions with the set of past documents; and wherein the validating comprises:
receiving, from a plurality of electronic device connected to the server, a current query, the current query being similar to the past query;
generating, by the server, a respective set of current documents relevant to the current query, each current document of the respective set of current documents including the first plurality of features and the meta-feature, the respective set of current documents being at least a subset of the set of past documents;
ranking, by the MLA, the respective set of current documents based at least in part on the first plurality of features and the meta-feature to obtain a respective final ranked list of documents;
transmitting, by the server to the plurality of electronic devices, a respective SERP including the respective final ranked list of documents;
receiving, by the server from the plurality of electronic devices, at least one respective user interaction with the respective SERP; and
determining, by the server, the usefulness of the meta-feature based on:
the respective user interactions with the respective SERPs.

3. The method of claim 1, wherein the respective value of the meta-feature for the given past document is based on the respective value of a given feature of the first plurality of features for the given past document and a value of a parameter associated with the set of past documents, the value of the parameter including at least one of:
a respective preliminary rank of the given past document, and
another value of another feature associated with one of the given past document and at least one other document.

4. The method of claim 2, wherein the method further comprises, prior to the generating the meta-feature:
ranking, by a second MLA executed by the server, the set of past documents based on at least a first feature of the first plurality of features to obtain a preliminary ranked list of documents, each past document of the set of past documents having the respective preliminary rank.

5. The method of claim 4, wherein the generating the meta-feature is further based on:
a respective value of another given feature of the first plurality of features for the given past document, and
a value of a second parameter associated with the set of past documents.

6. The method of claim 5, wherein the value of the second parameter is at least one of:
the respective preliminary rank of the given past document,
a value of the other given feature of at least one other document of the set of past documents, and
another value of another feature associated with one of the given past document and at least one other document.

7. The method of claim 3, wherein the value of the parameter for the given past document in the set of past documents is an average value of the given feature for the set of past documents.

8. The method of claim 3, further comprising: repeating the method for a set of past queries, a respective set of past documents having been provided as respective search results in response to a respective past query of the set of past queries, the respective set of past documents being associated with respective past user interactions.

9. The method of claim 8, wherein the determining the threshold comprises:
applying, by the server, a user engagement metric on the respective sets of past documents based on the respective past user interactions to obtain the threshold; and wherein
the determining the usefulness of the meta-feature comprises:
applying, by the server, a current user engagement metric on the respective SERPs based on the respective user interactions with the respective SERPs to obtain the usefulness.

10. The method of claim 7, wherein the meta-feature is a first meta-feature of a set of meta-features; and wherein
the generating the first meta-feature further comprises generating each respective meta-feature of the set of meta-features, each respective value of the respective meta-feature being generated based on:
a respective value of a respective feature of the first plurality of features, and
a respective parameter associated with the respective set of past documents; and
the determining to use the first-meta feature is executed further in response to the current user engagement metric of the first meta-feature being above respective current user engagement metrics of remaining meta-features of the set of meta-features.

11. The method of claim 2, wherein the given feature is one of:
a query-dependent feature, and
a query-independent feature.

12. The method of claim 11, wherein the respective value of the query-independent feature for the given past document is one of:
past values for the query-independent feature, and
predicted values for the query independent feature.

13. A computer-implemented method for generating a meta-feature for ranking documents by a machine learning algorithm (MLA) executed by a server, the MLA having been trained to generate the meta-feature for ranking the documents in response to a given query, the method executable by the server, the method comprising:
receiving, from an electronic device connected to the server, a new query, the MLA not having been trained to rank documents based at least in part on the meta-feature for the new query;
generating, by the server, a set of current documents relevant to the new query, each current document of the respective set of current documents including a first plurality of features;
generating, by the MLA, the meta-feature, a respective value of the meta-feature for a given current document being a relative value between a respective predicted value of a given feature of the first plurality of features for the given current document and at least one other respective predicted value of the given feature associated with other ones of the set of current documents;
ranking, by the MLA, the set of current documents based at least in part on the first plurality of features and the meta-feature to obtain a respective final ranked list of documents; and
transmitting, by the server to the electronic device, a respective SERP including the respective final ranked list of documents.

14. The method of claim 13, further comprising:
during a training phase:
acquiring, by the server, a set of past queries, each query of the set of past queries having been previously submitted on the server;
acquiring, for each query of the set of past queries, a respective set of past documents, the respective set of past documents having been presented as respective search results in response to the respective query, each past document of the respective set of past documents having:
a first plurality of features, and
respective values for the first plurality of features;
generating, for each set of past documents, the meta-feature, a respective value of the meta-feature for a given past document of the respective set of past documents being a relative value between a respective value of a given feature of the first plurality of features for the given past document, and at least one other value of the given feature for other ones in the respective set of past documents;
validating, by the server, the meta-feature based on a usefulness thereof for ranking future search engine results pages (SERPs) in response to current queries, each of the current query being one of the set of past queries,
the usefulness of the meta-feature being determined by comparing, by the processor, user interactions with:
(i) a current ranking of the respective set of past documents and (ii) a new ranking of the respective set of past documents, the new ranking being based at least on the meta-feature;
in response to the usefulness of the meta-feature being above a predetermined threshold:
training, by the server, the MLA to generate the meta-feature.

15. The method of claim 14, wherein the validating comprises:
receiving, from a plurality of electronic device connected to the server, the current queries;
generating, by the server, a respective set of current documents relevant to each one of the current queries, each current document of the respective set of current documents including the first plurality of features and the meta-feature;
ranking, by the MLA, the respective sets of current documents based at least in part on the first plurality of features and the meta-feature to obtain the respective final ranked list of documents;
transmitting, by the server to the plurality of electronic devices, respective SERPs, each respective SERPs including the respective final ranked list of documents;
receiving, by the server from the plurality of electronic devices, at least one respective user interaction with the respective SERP; and
determining, by the server, the usefulness of the meta-feature based on:
the respective user interactions with the respective SERPs.

16. The method of claim 15, wherein the respective set of past documents is associated with respective past user interactions; and wherein
the method further comprises, prior to the validating the meta-feature:
applying, by the server, a user engagement metric on the respective sets of past documents based on the respective past-user interactions to obtain the threshold; and wherein
the determining the usefulness of the meta-feature comprises:
applying, by the server, a current user engagement metric on the respective SERPs based on the respective user interactions with the respective SERPs to obtain the usefulness.

17. The method of claim 16, wherein the MLA is trained to generate the meta-feature based on:
the meta-feature,
the respective SERP, the respective SERP including the respective final ranked list of documents having been generated based in part on the meta-feature, and
the respective user interactions with the respective SERP.

18. A computer-implemented method for ranking documents in response to a given query using a meta-feature by a machine learning algorithm (MLA) executed by a server, the method executable by the server, the method comprising:
receiving, from an electronic device connected to the server, a given query;
generating, by the server, a set of current documents relevant to the new query, each current document of the respective set of current documents including a first plurality of features;
ranking, by the MLA, the set of current documents based on at least a portion of the first plurality of features to obtain a preliminary ranked list of documents;
generating, by the MLA, the meta-feature, a respective value of the meta-feature for a given current document in the preliminary ranked list of documents being a relative value between a respective value of a given feature of the first plurality of features for the given current document and a respective preliminary ranking score thereof in the preliminary ranked list of documents;

ranking, by the MLA, the preliminary ranked list of documents based on at least the meta-feature to obtain a respective final ranked list of documents; and transmitting, by the server to the electronic device, a respective SERP including the respective final ranked list of documents in response to the given query.

* * * * *